United States Patent
Ujihara

(10) Patent No.: US 12,386,069 B2
(45) Date of Patent: Aug. 12, 2025

(54) MEASUREMENT APPARATUS AND MEASUREMENT METHOD

(71) Applicant: Mitutoyo Corporation, Kawasaki (JP)

(72) Inventor: Hiroki Ujihara, Ibaraki (JP)

(73) Assignee: Mitutoyo Corporation, Kawasaki (JP)

( * ) Notice: Subject to any disclaimer, the term of this patent is extended or adjusted under 35 U.S.C. 154(b) by 849 days.

(21) Appl. No.: 17/674,111

(22) Filed: Feb. 17, 2022

(65) Prior Publication Data

US 2022/0268931 A1 Aug. 25, 2022

(30) Foreign Application Priority Data

Feb. 24, 2021 (JP) ................................. 2021-027060

(51) Int. Cl.
 *G01S 17/34* (2020.01)
 *G01S 7/48* (2006.01)
(52) U.S. Cl.
 CPC ............ *G01S 17/34* (2020.01); *G01S 7/4808* (2013.01)
(58) Field of Classification Search
 None
 See application file for complete search history.

(56) References Cited

U.S. PATENT DOCUMENTS

| | | | | |
|---|---|---|---|---|
| 10,802,120 B1 * | 10/2020 | LaChapelle | ........... | G01S 7/4917 |
| 2005/0017891 A1 * | 1/2005 | Kuroda | ................ | G01S 7/4026 |
| | | | | 342/72 |
| 2005/0213862 A1 | 9/2005 | Kawanishi et al. | | |
| 2005/0220385 A1 | 10/2005 | Kawanishi et al. | | |
| 2020/0318945 A1 * | 10/2020 | Mutlu | ...................... | G01P 5/26 |
| 2021/0181310 A1 * | 6/2021 | Lu | ......................... | G01S 7/4818 |

FOREIGN PATENT DOCUMENTS

| | | |
|---|---|---|
| JP | 3583906 B2 | 11/2004 |
| JP | 3867148 B2 | 1/2007 |
| JP | 4524482 B2 | 8/2010 |

OTHER PUBLICATIONS

Takefunmi Hara, "Distance Sensing by FSL Laser and Its Application", vol. 7, No. 3, 2012, pp. 25-31 (with English translation)(10 pages).

* cited by examiner

*Primary Examiner* — Hovhannes Baghdasaryan
(74) *Attorney, Agent, or Firm* — Oblon, McClelland, Maier & Neustadt, L.L.P.

(57) ABSTRACT

A measurement apparatus including a laser apparatus that outputs a frequency-modulated laser beam with a plurality of modes of a main lobe, branch that splits the frequency-modulated laser beam into a reference light, a measurement light, and a monitor light, beat signal generator that generates a beat signal by mixing the reference light and a reflected light that is reflected by radiating the measurement light onto an object to be measured, extraction circuitry that extracts a signal component including a plurality of self-beat signals based on the main lobe from the monitor light, identification circuitry that identifies a cavity frequency of the optical cavity on the basis of the signal component, and calculation circuitry that calculates a difference between propagation distances between the reference light and the measurement light on the basis of the cavity frequency and the beat signal.

19 Claims, 15 Drawing Sheets

| $v_s$ | $n_s$ |
|---|---|
| $v_s > 2v_c$ | $n_s \neq 0$ |
| $v_c < v_s < 2v_c$ | $n_s \neq 0,1$ |
| $0 < v_s < v_c$ | $n_s < v_c/v_s$ or $n_s > 2v_c/v_s$ |

FIG. 16

MEASUREMENT APPARATUS AND MEASUREMENT METHOD

CROSS-REFERENCE TO RELATED APPLICATIONS

The present application claims priority to Japanese Patent Application number 2021-027060, filed on Feb. 24, 2021. The contents of this application are incorporated herein by reference in their entirety.

BACKGROUND

A frequency-shifted feedback laser (FSFL) which is provided with a frequency shifter in a cavity (resonator) and outputs a plurality of longitudinal-mode lasers whose oscillation frequencies vary linearly with time is known. Also, an optical distance meter using such an FSFL is known (see, e.g., Patent Document 1, the Specification of Japanese Patent No. 3583906, and Non-Patent Document 1, "Distance Sensing by FSF Laser and Its Application," by Takefumi HARA, Optonews, Vol. 7, No. 3, 2012, pp. 25-31). Also, as a frequency shifter, an optical single side band (SSB) modulator is known (see, Patent Documents 2, the Specification of Japanese Patent No. 3867148, and Patent Document 3, the Specification of Japanese Patent No. 4524482, for example).

An optical distance meter using a frequency-shifted feedback laser (FSFL) can acquire a large amount of three-dimensional information in a contactless manner, and has been used, for example, at design and production sites. The FSFL sometimes caused a reduction in measurement accuracy of the optical distance meter, since a cavity length may change due to environmental fluctuations such as temperature. In order to prevent the reduction in measurement accuracy, it is conceivable to measure a cavity frequency (resonator frequency) multiple times, but throughput is reduced in this case since the measurement time becomes longer.

SUMMARY

The present disclosure has been made in view of this point, and its object is to enable the measurement of a distance with high accuracy while suppressing the reduction of throughput in the optical distance meter.

A first aspect of the present disclosure provides a measurement apparatus including: a laser apparatus, having a frequency shifter in an optical cavity, that outputs a frequency-modulated laser beam with a plurality of modes of a main lobe; a branching part that splits the frequency-modulated laser beam output from the laser apparatus into a reference light, a measurement light, and a monitor light; a beat signal generation part that generates a beat signal by mixing the reference light and a reflected light that is reflected by radiating the measurement light onto an object to be measured; an extraction part that extracts a signal component including a plurality of self-beat signals based on the main lobe from an electrical signal generated by converting the monitor light; an identification part that identifies a cavity frequency of the optical cavity on the basis of the signal component extracted by the extraction part; and a calculation part that calculates a difference between propagation distances of the reference light and the measurement light on the basis of the cavity frequency of the optical cavity identified by the identification part and the beat signal.

A second aspect of the present disclosure provides a measurement method including the steps of: outputting a frequency-modulated laser beam with a plurality of modes of a main lobe from a laser apparatus having a frequency shifter in an optical cavity; splitting the frequency-modulated laser beam into a reference light, a measurement light, and a monitor light; generating a beat signal by mixing the reference light and a reflected light that is reflected by radiating the measurement light onto an object to be measured; converting the monitor light into an electrical signal; extracting a signal component including a plurality of self-beat signals based on the main lobe from the electrical signal; identifying a cavity frequency of the optical cavity based on the extracted signal component; and calculating a difference between propagation distances of the reference light and the measurement light on the basis of the identified cavity frequency of the optical cavity and the beat signal.

BRIEF DESCRIPTION OF THE DRAWINGS

FIG. 16 shows an example of conditions of $n_s$ where the absolute value of $n_c$ is equal to or greater than 2.

DETAILED DESCRIPTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Configuration Example of a Measurement Apparatus 100

Figure 1:
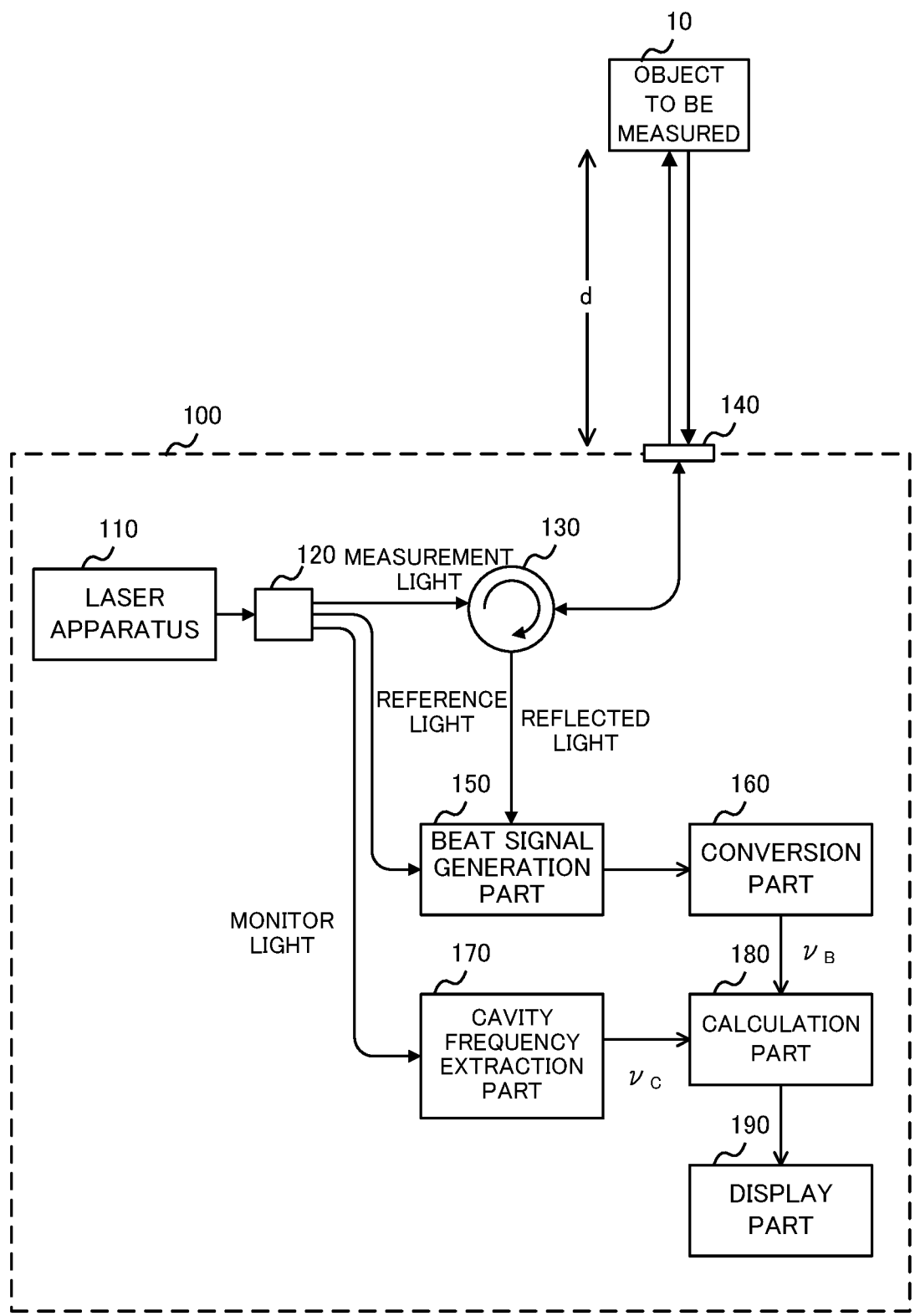
FIG. 1 shows a configuration example of a measurement apparatus 100 according to the present embodiment together with an object to be measured 10.

FIG. 1 shows a configuration example of a measurement apparatus 100 according to the present embodiment together with an object to be measured 10. The measurement apparatus 100 optically measures a distance between the measurement apparatus 100 and the object to be measured 10. Also, the measurement apparatus 100 may measure the three-dimensional shape of the object to be measured 10 by scanning a position of a laser beam radiated onto the object to be measured 10. The measurement apparatus 100 includes a laser apparatus 110, a branching part 120, an optical circulator 130, an optical head part 140, a beat signal generation part 150, a conversion part 160, a cavity frequency extraction part 170, a calculation part 180, and a display part 190.

The laser apparatus 110 has an optical cavity (laser resonator) and outputs a frequency-modulated laser beam with a plurality of modes. The laser apparatus 110 is provided with a frequency shifter in a cavity (resonator), and outputs a plurality of longitudinal mode lasers whose oscillation frequencies change linearly with the passage of time. The laser apparatus 110 is a frequency-shifted feedback laser (FSFL), for example. The FSFL will be described later.

The branching part 120 splits the frequency-modulated laser beam output from the laser apparatus 110, with a portion of it as a reference light and at least some of the remaining portion of it as a measurement light. The branching part 120 splits the frequency-modulated laser beam output from the laser apparatus 110 into the reference light, the measurement light, and a monitor light, for example. The branching part 120 is, for example, a one-in-three-out fiber optic coupler. In the example of FIG. 1, the branching part 120 supplies the measurement light to the optical circulator 130, the reference light to the beat signal generation part 150, and the monitor light to the cavity frequency extraction part 170. FIG. 1 shows an example in which the branching part 120 is the one-in-three-out optical coupler, but the branching part 120 may alternatively be a combination of two one-in-two-out optical couplers.

The optical circulator 130 has a plurality of input/output ports. For example, the optical circulator 130 outputs a light, which is input from one port, to the next port, and further outputs a light which is input from the next port, to the port after next. FIG. 1 shows an example in which the optical circulator 130 has three input/output ports. In this case, the optical circulator 130 outputs the measurement light supplied from the branching part 120 to the optical head part 140. Also, the optical circulator 130 outputs a light input from the optical head part 140 to the beat signal generation part 150.

The optical head part 140 radiates the light input from the optical circulator 130 toward the object to be measured 10. The optical head part 140 includes a collimator lens, for example. In this case, the optical head part 140 first adjusts the light input from the optical circulator 130 via an optical fiber into a beam shape using a collimator lens, and then outputs the light.

Also, the optical head part 140 receives a reflected light of the measurement light radiated onto the object to be measured 10. The optical head part 140 focuses the received reflected light onto the optical fiber with a collimator lens and supplies it to the optical circulator 130. In this case, the optical head part 140 may include one common collimator lens, and the collimator lens may irradiate the object to be measured 10 with the measurement light and receive the reflected light from the object to be measured 10. The distance between the optical head part 140 and the object to be measured 10 is defined as d.

Alternatively, the optical head part 140 may include a focusing lens. In this case, the optical head part 140 focuses the light input from the optical circulator 130 via the optical fibers onto the surface of the object to be measured 10. The optical head part 140 receives at least a part of the reflected light reflected on the surface of the object to be measured 10. The optical head part 140 focuses the received reflected light onto an optical fiber using the focusing lens and supplies the light to the optical circulator 130. Also in this case, the optical head part 140 may include one common focusing lens, and the focusing lens may irradiate the object to be measured 10 with the measurement light and receive the reflected light from the object to be measured 10.

The beat signal generation part 150 receives, from the optical circulator 130, the reflected light that is reflected by radiating the measurement light onto the object to be measured 10. Also, the beat signal generation part 150 receives the reference light from the branching part 120. The beat signal generation part 150 mixes the reflected light and the reference light to generate a beating signal. The beat signal generation part 150 includes a photoelectric conversion element, for example, converts the beat signal into an electrical signal, and outputs the electrical signal Here, since the reflected light travels back and forth across the distance from the optical head part 140 to the object to be measured 10, a difference in a propagation distance corresponding to at least the distance 2d occurs as compared with the reference light. Since the oscillation frequency of the light output from the laser apparatus 110 changes linearly with the passage of time, a frequency difference, which is dependent on a propagation delay corresponding to the difference in the propagation distance, occurs between the oscillation frequency of the reference light and the oscillation frequency of the reflected light. The beat signal generation part 150 generates a beat signal corresponding to such a frequency difference.

The conversion part 160 performs a frequency analysis on the beat signal generated by the beat signal generation part 150 to detect the frequency of the beat signal. Here, the frequencies of the beat signals are defined as $v_B$.

The cavity frequency extraction part 170 extracts a signal component corresponding to the cavity frequency of the optical cavity and is superposed on the frequency-modulated laser beam output from the laser apparatus 110. For example, the cavity frequency extraction part 170 extracts a signal component of the frequency equal to the cavity frequency corresponding to the cavity length of the laser apparatus 110 from among signal components included in the frequency-modulated laser beam on the basis of the monitor light. Here, the cavity frequency is defined as $v_c$.

The calculation part 180 calculates a difference between propagation distances of the reference light and the measurement light based on a detection result of the conversion part 160 and an extraction result of the cavity frequency extraction part 170. For example, the calculation part 180 calculates the distance d from the optical head part 140 to the object to be measured 10 on the basis of the frequency $v_B$ of the beat signal and the cavity frequency $v_c$.

The display part 190 displays the calculation result of the calculation part 180. The display part 190 may include a display or the like to display the calculation result. Also, the display part 190 may store the calculation result in a storage unit or the like. The display part 190 may supply the calculation result to an external device via a network or the like.

The measurement apparatus 100 described above can measure the distance d between the measurement apparatus 100 and the object to be measured 10 by analyzing the frequency difference between the reflected light of the measurement light radiated onto the object to be measured 10 and the reference light. That is, the measurement apparatus 100 can form a non-contact and non-destructive optical distance meter. Next, a more detailed configuration of the measurement apparatus 100 will be described.

Configuration Example of the Laser Apparatus 110

Figure 2:
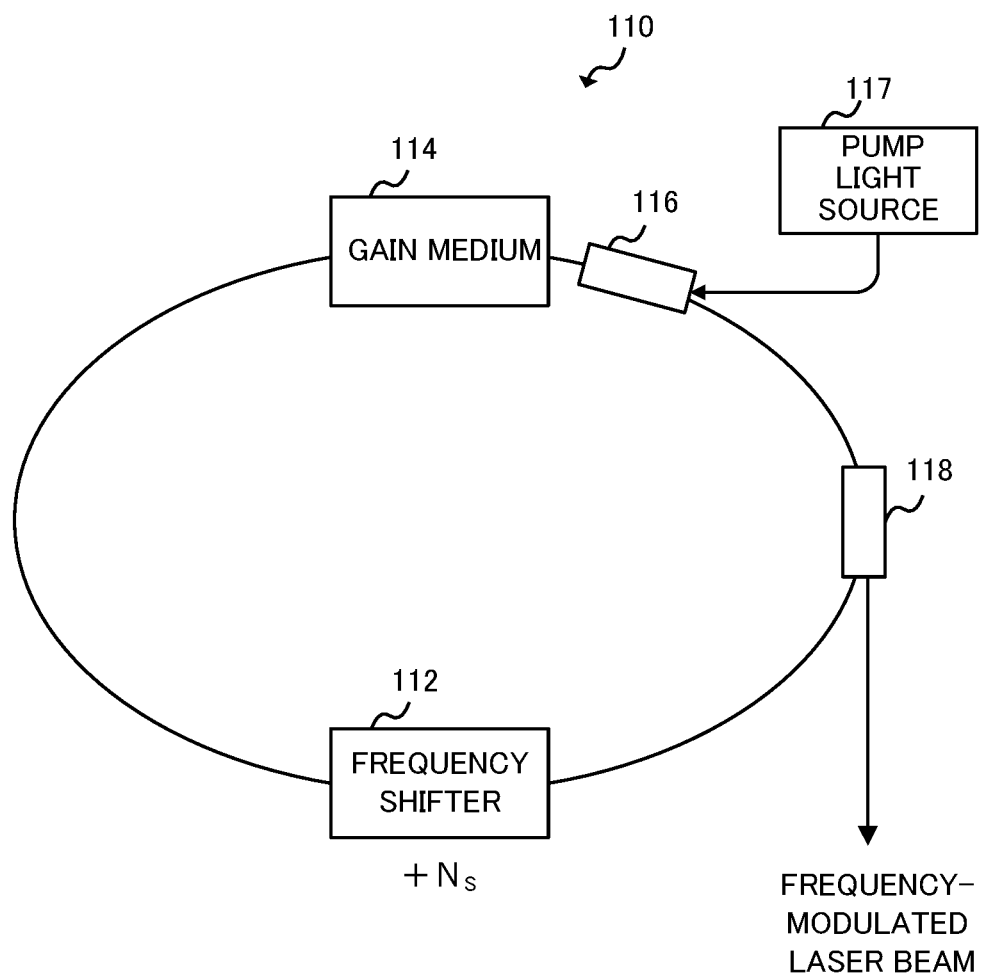
FIG. 2 shows a configuration example of a laser apparatus 110 according to the present embodiment.

FIG. 2 shows a configuration example of the laser apparatus 110 according to the present embodiment. The laser apparatus 110 of FIG. 2 shows an example of the FSFL. The laser apparatus 110 includes a frequency shifter in the optical cavity and oscillates a laser beam in the optical cavity. The laser apparatus 110 includes a frequency shifter 112, a gain medium 114, a WDM coupler 116, a pump light source 117, and an output coupler 118.

The frequency shifter 112 shifts a frequency of a light to be input by an approximately constant frequency. The frequency shifter 112 is, for example, an acousto-optic frequency shifter (AOFS) having acousto-optic elements. Here, the amount of the frequency shift by the frequency shifter 112 is defined as $+v_s$. That is, the frequency shifter 112 shifts the frequency of the light circulating around the cavity to increase the frequency by $v_s$ for each round.

The gain medium 114 is supplied with a pump light and amplifies the input light. The gain medium 114 is, for example, an optical fiber doped with impurities. The impurities are, for example, rare earth elements such as erbium, neodymium, ytterbium, terbium, thulium, or the like. The gain medium 114 is supplied with the pump light from the pump light source 117 via the WDM coupler 116. The output coupler 118 outputs, to an external device, a part of the light that has been laser-oscillated in the cavity.

That is, the laser apparatus 110 shown in FIG. 2 includes a fiber ring laser having the frequency shifter 112 in the cavity. The laser apparatus 110 preferably further includes an isolator in the cavity. Also, the laser apparatus 110 may have an optical bandpass filter that passes light of a predetermined wavelength band in the cavity. The following describes frequency characteristics of the laser beam output from the laser apparatus 110.

Figure 3:
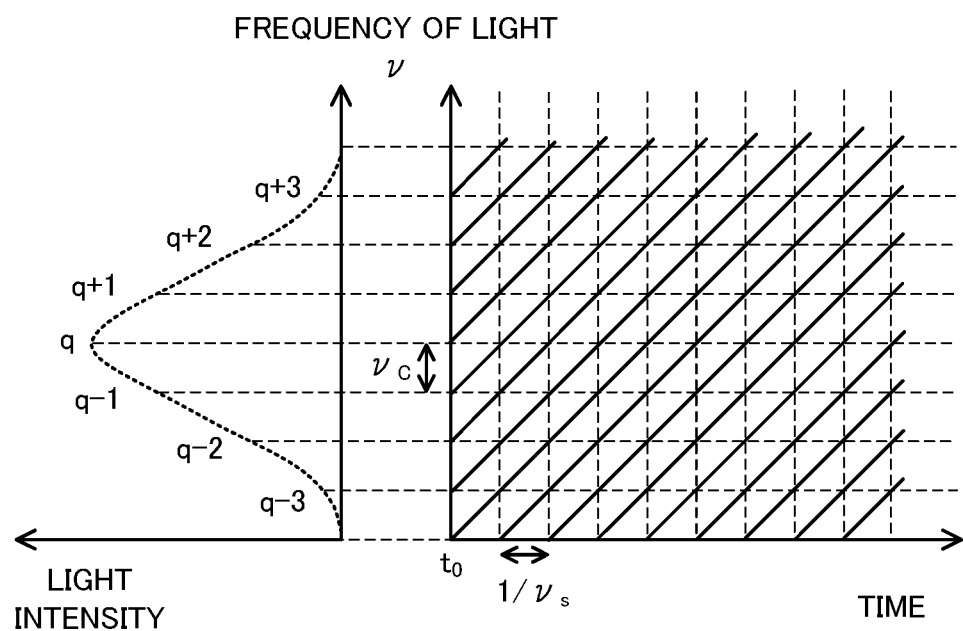
FIG. 3 shows an example of a laser beam output from the laser apparatus 110 according to the present embodiment.

FIG. 3 shows an example of the laser beam output from the laser apparatus 110 according to the present embodiment. The laser beam output by the laser apparatus 110 shown in FIG. 3 is referred to as a main lobe. FIG. 3 shows, on the left, a light spectrum of the laser beam output from the laser apparatus 110 at the time $t_0$. In the light spectrum, the horizontal axis indicates the light intensity, and the vertical axis indicates the frequency of the light. Also, a plurality of longitudinal modes of the light spectrum are denoted by the numbers q. The frequencies of longitudinal modes of the main lobe are arranged at approximately constant frequency intervals. Supposing that $\tau_{RT}(=1/v_c)$ denotes the time for light to go around the cavity once, the longitudinal modes of the main lobe are arranged at intervals of $1/\tau_{RT}(=v_c)$, as represented by the following equation. It should be noted that $v_0$ is the initial frequency of the light spectrum at the time $t_0$.

$$v_q(t_0) = v_0 + \frac{q}{\tau_{RT}} \quad \text{[Equation 1]}$$

FIG. 3 shows, on the right, changes in frequencies with the passage of time of the longitudinal modes of the main lobe output from the laser apparatus 110. On the right side of FIG. 3, the horizontal axis indicates the time and the vertical axis indicates the frequency. That is, FIG. 3 shows a change over time in the frequency of the main lobe output from the laser apparatus 110 on the right side, and shows an instantaneous frequency of the laser beam at the time $t_0$ on the left side.

In the laser apparatus 110, each time the light in the cavity goes around the cavity, the frequency shifter 112 increases the frequency of the light traveling around the cavity by $v_s$. That is, since the frequency of each of the modes increases by $v_s$ for every passing of $\tau_{RT}$, the rate of change of frequency dv/dt (i.e., chirp rate) becomes approximately equal to $v_s/\tau_{RT}$. Therefore, the longitudinal modes of the main lobe represented by Equation 1 change as shown in the following equation with the passage of the time t.

$$v_q(t) = v_0 + \frac{v_s}{\tau_{RT}}t + \frac{q}{\tau_{RT}} \quad \text{[Equation 2]}$$

[Details of a Distance Measurement Process]

The measurement apparatus 100 according to the present embodiment measures the distance d between the optical head part 140 and the object to be measured 10 by using the laser apparatus 110 that outputs the frequency elements represented with Equation 2. Suppose that an optical path difference between the reference light and the reflected light is only the distance 2d, which is the reciprocated distance d, and the propagation delay corresponding to the distance 2d is $\Delta t$. That is, when the measurement light is reflected and returned from the object to be measured 10 at the time t, the frequency of the returned reflected light approximately matches the past frequency that is a time $\Delta t$ earlier than the time t, and therefore can be expressed by the following equation.

$$v_q(t - \Delta t) = v_0 + \frac{v_s}{\tau_{RT}}(t - \Delta t) + \frac{q}{\tau_{RT}} \quad \text{[Equation 3]}$$

On the other hand, the reference light at the time t can be expressed by the following equation in a similar manner as with Equation 2. Here, the reference light is $v_{q'}(t)$.

$$v_{q'}(t) = v_0 + \frac{v_s}{\tau_{RT}}t + \frac{q'}{\tau_{RT}} \quad \text{[Equation 4]}$$

Because the beat signal generation part 150 superposes the reflected light and the reference light, a plurality of beat signals between the plurality of longitudinal modes expressed by Equation 3 and the plurality of longitudinal modes expressed by Equation 4 are generated. Supposing that the frequencies of such beat signals are $v_B(m, d)$, $v_B(m, d)$ can be expressed by the following equation from Equations 3 and 4. It should be noted that m is an interval (difference between the longitudinal mode numbers of the measurement light and the longitudinal mode numbers of the reference light) of the longitudinal mode numbers (=q−q'), and $\Delta t=2d/c$.

$$v_B(m, d) = v_{q'}(t) - v_q(t - \Delta t) = \frac{v_s}{\tau_{RT}} \cdot \frac{2d}{c} - \frac{m}{\tau_{RT}} \quad \text{[Equation 5]}$$

From Equation 5, the distance d is expressed by the following equation. Here, $1/\tau_{RT}=v_c$.

$$d = \frac{c}{2v_s v_c}\{v_B(m, d) + m v_c\} \quad \text{[Equation 6]}$$

From Equation 6, it can be understood that the distance d can be calculated from a frequency observation result of the beat signal by determining the difference m of the longitudinal mode numbers. It should be noted that the difference m can be determined by detecting a change in the beat signal when the amount of frequency shift $v_s$ of the laser apparatus 110 is changed. Since such a method of determining the difference m is known, as described in Patent Document 1 or the like, its detailed description is omitted.

Since the observed beat signal is always a positive frequency, in calculation, the beat signal generated on the negative frequency side is folded back on the positive side and observed as an image signal. Next, the generation of such an image signal will be described.

Figure 4:
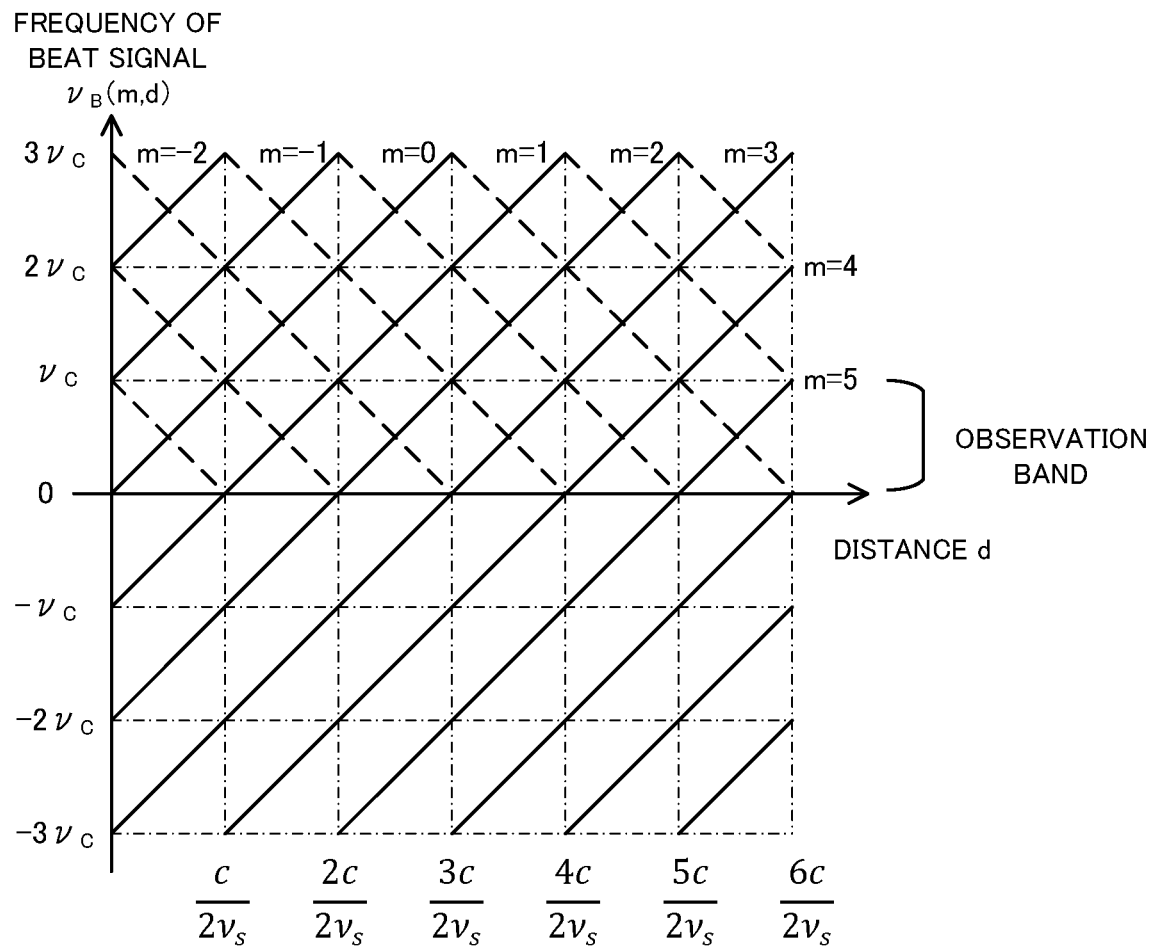
FIG. 4 shows an example of a relationship between (i) a frequency of a beat signal detected by the measurement apparatus 100 according to the present embodiment, (ii) a distance d between the optical head part 140 and the object to be measured 10.

FIG. 4 shows an example of a relationship between (i) the frequency of the beat signal detected by the measurement apparatus 100 according to the present embodiment and (ii) the distance d between the optical head part 140 and the object to be measured 10. In FIG. 4, the horizontal axis indicates the distance d, and the vertical axis indicates the frequency $v_B(m, d)$ of the beat signal. The plurality of straight lines shown by solid lines in FIG. 4 are graphs showing the relationship of the frequency $v_B(m, d)$ of the beat signal with respect to the distance d for each of the plurality of values of m, as shown in Equation 5.

As shown in FIG. 4, a plurality of beat signals corresponding to the value of m are generated. However, since the plurality of longitudinal modes included in each of the reflected light and the reference light are arranged at approximately constant frequency intervals $v_c$, a plurality of beat signals having equal values of m are superposed on the approximately same frequency on the frequency axis. For example, when a frequency band between frequencies 0 and $v_c$ is observed, a plurality of beat signals are superposed on approximately same frequency and are observed as a single line spectrum.

In addition, the absolute value of the frequency $v_B(m, d)$ of the beat signal in the negative range smaller than 0 is further observed as the image signal. That is, the graph of the region in which the vertical axis of FIG. 4 is smaller than 0 is folded back with a frequency 0 as a boundary. FIG. 4 shows the folded image signal by a plurality of dotted lines. Since only the positive and negative of the folded image signals are inverted, the image signals are superposed on the observed frequency axis at the same frequency as the absolute value of the frequency before being folded. For example, when a frequency band between frequencies 0 and $v_c$ is observed, the beat signal and the image signal are respectively located at different frequencies unless the frequencies of the beat signal and the image signal become $v_c/2$.

As described above, in the observation band between the frequencies 0 and $v_c$, two line spectra are generated, which are (i) the beat signal $v_B(m, d)$ and (ii) the image signal $v_B(m', d)$ whose value of m is different from that of the beat signal $v_B(m, d)$. Here, as an example, m'=m+1. In this case, the beat signal generation part 150 can cancel such an image signal by using a quadrature detection. Next, the beat signal generation part 150 and the conversion part 160 using the quadrature detection will be described.

Figure 5:
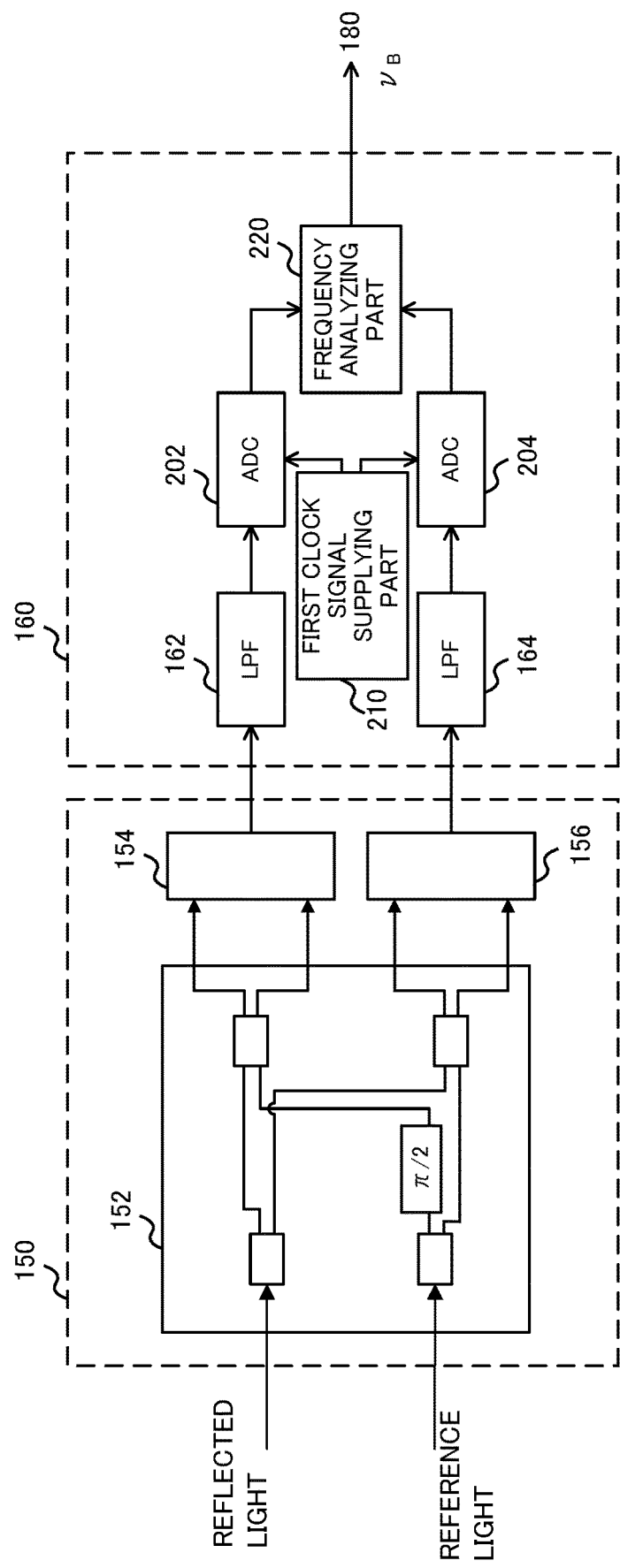
FIG. 5 shows a configuration example of a beat signal generation part 150 and a conversion part 160 according to the present embodiment.

Configuration Example of the Beat Signal Generation Part 150 and the Conversion Part FIG. 5 shows a configuration example of the beat signal generation part 150 and the conversion part 160 according to the present embodiment. The beat signal generation part 150 detects the reflected light and the reference light orthogonally. The beat signal generation part 150 quadrature-detects the reflected light and the reference light. The beat signal generation part 150 includes an optical 90-degree hybrid 152, a first photoelectric conversion part 154, and a second photoelectric conversion part 156.

The optical 90-degree hybrid 152 respectively splits the input reflected light and the input reference light into two. The optical 90-degree hybrid 152 multiplexes one of the branched reflected lights and one of the branched reference lights with an optical coupler or the like to generate the first beat signal. The optical 90-degree hybrid 152 multiplexes the other branched reflected light and the other branched reference light with the optical coupler or the like to generate the second beat signal. Here, the optical 90-degree hybrid 152 generates a beat signal after generating a phase difference of 90 degrees between the two branched reference lights. For example, the optical 90-degree hybrid 152 multiplexes the branched reflected light with one of the branched reference light and multiplexes the branched reflected light with a light generated by the other branched reference light passing through a n/2 wavelength plate.

The first photoelectric conversion part 154 and the second photoelectric conversion part 156 receive the multiplexed reflected light and reference light and convert them into electrical signals. Each of the first photoelectric conversion part 154 and the second photoelectric conversion part 156 may be a photodiode or the like. Each of the first photoelectric conversion part 154 and the second photoelectric conversion part 156 is, for example, a balanced photodiode. In FIG. 5, suppose that the first photoelectric conversion part 154 generates a first beat signal and the second photoelectric conversion part 156 generates a second beat signal. As described above, the beat signal generation part 150 performs the quadrature detections by multiplexing two reference lights and two reflected lights having phases differing by 90 degrees, respectively, and outputs two beat signals to the conversion part 160.

The conversion part 160 performs a frequency analysis on the two beat signals. Here, an example in which the conversion part 160 performs the frequency analysis using the first beat signal as an I signal and the second beat signal as a Q signal, will be described. The conversion part 160 includes a first filter part 162, a second filter part 164, a first AD converter 202, a second AD converter 204, a first clock signal supplying part 210, and a frequency analyzing part 220.

The first filter part 162 and the second filter part 164 reduce signal components in a frequency band differing from a frequency band that a user or the like wants to analyze. Here, the frequency band that the user or the like wants to analyze is set from 0 to $v_c$. The first filter part 162 and the second filter part 164 are, for example, low-pass filters that pass signal components having a frequency equal to or less than $v_c$. In this case, the first filter part 162 supplies the first beat signal obtained by reducing the signal components having a frequency higher than the frequency $v_c$ to the first AD converter 202. Also, the second filter part 164 supplies the second beat signal obtained by reducing the signal components having a frequency higher than the frequency $v_c$ to the second AD converter 204.

The first AD converter 202 and the second AD converter 204 convert analog signals to be input into digital signals. For example, the first AD converter 202 converts the first beat signal into a digital signal, and the second AD converter 204 converts the second beat signal into a digital signal. The first clock signal supplying part 210 supplies first clock signals to the first AD converter 202 and the second AD converter 204. By doing this, the first AD converter 202 and the second AD converter 204 convert the analog signals into the digital signals at approximately the same first sampling rate as a clock frequency of the received first clock signal.

Here, when the observation band is from 0 to $v_c$, the frequency of the beat signals is at most the cavity frequency $v_c$ of the optical cavity. Therefore, the first clock signal supplying part 210 supplies first clock signals having a frequency greater than or equal to twice the cavity frequency $v_c$ of the optical cavity to the first AD converter 202 and the second AD converter 204, whereby the beat signals can be observed.

The frequency analyzing part 220 converts the first beat signal and the second beat signal into frequency data. As an example, the frequency analyzing part 220 performs a digital Fourier transform (DFT) on the first beat signal and the second beat signal. The frequency analyzing part 220 adds the first beat signal converted into the frequency data as the real part and the second beat signal converted into the frequency data as the imaginary part, and cancels the image signal. As described above, the conversion part 160 converts the beat signals into the digital signals at the first sampling rate, and then performs the frequency analysis on the digital signals. It should be noted that after the beat signals are converted into the digital signals, the conversion part 160 may configure a frequency analyzing part 220 using an integrated circuit or the like. The quadrature detection in the beat signal generation part 150 and the frequency analysis in the conversion part 160 will be described below.

[Outline of the Quadrature Detection]

Figure 6:
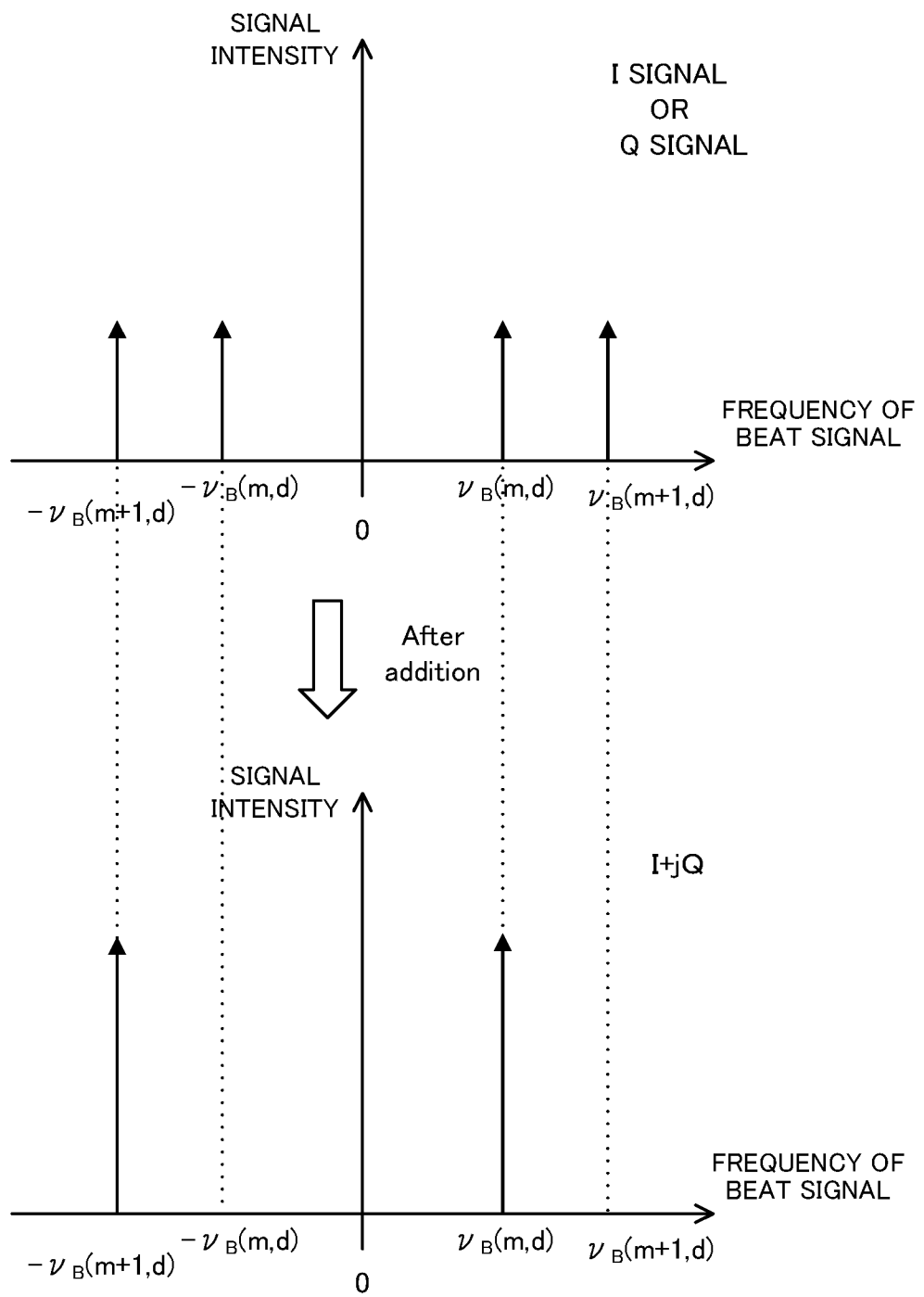
FIG. 6 shows an example of an outline of a quadrature detection by the beat signal generation part 150 and the conversion part 160 according to the present embodiment.

FIG. 6 shows an example of an outline of the quadrature detection by the beat signal generation part 150 and the conversion part 160 according to the present embodiment. In FIG. 6, the horizontal axis indicates the frequency of the beat signal, and the vertical axis indicates the signal intensity. FIG. 6 shows a frequency spectrum of one of the I signal and the Q signal. The frequency spectra of both the I and Q signals have approximately the same spectral shape, as shown in the upper part of FIG. 6. In the I signal and the Q signal, for example, a beat signal $v_B(m, d)$ and an image signal $v_B(m+1, d)$ are observed in a frequency band between the frequencies 0 and $v_c$. In this case, in the I and Q signals, a beat signal $-v_B(m, d)$ and an original beat signal $-v_B(m+1, d)$ of the image signal exist in a frequency band between the frequencies 0 and $-v_c$ on the negative side.

Here, since the I signal and the Q signal are signal components being quadrature-detected by the beat signal generation part 150, they include different phase information even if the spectral shapes are the same. For example, in the frequency band between the frequencies 0 and $v_c$ on the positive side, phases of the image signal $v_B(m+1, d)$ of the I signal and the image signal $v_B(m+1, d)$ of the Q signal are mutually inverted. Similarly, in the frequency band between the frequencies 0 and $-v_c$ on the negative side, phases of the beat signal $-v_B(m, d)$ of the I signal and the beat signal $-v_B(m, d)$ of the Q signal are mutually inverted.

Therefore, as shown in the lower part of FIG. 6, when the frequency analyzing part 220 calculates I+jQ using the I signal and the Q signal, the beat signals of the frequency $v_B(m, d)$ strengthen each other and the image signals of the frequency $v_B(m+1, d)$ cancel each other out in the frequency band between the frequencies 0 and $v_c$. Similarly, in the frequency band between the frequencies 0 and $-v_c$, the beat signals of the frequency $-v_B(m+1, d)$ strengthen each other and the beat signals of the frequency $-v_B(m, d)$ cancel each other out.

According to the frequency analysis result of the frequency analyzing part 220, one beat signal is observed for the frequency $v_B(m, d)$ in the frequency band between the frequencies 0 and $v_c$. Since the measurement apparatus 100 can cancel out the image signal in this manner, the frequency $v_B(m, d)$ of the beat signal can be detected. For example, the frequency analyzing part 220 outputs, as the frequency $v_B(m, d)$ of the beat signal, a frequency at which the signal intensity of the converted frequency signal is highest.

Here, the distance d measured by the measurement apparatus 100 is expressed by Equation 6. From Equation 6, it can be seen that the distance d can be calculated by using three frequencies $v_c$, $v_s$ and $v_B(m, d)$. Among the three frequencies, $v_B(m, d)$ can be detected as described above. Also, since $v_c$ and $v_s$ are the frequencies determined based on components used in the laser apparatus 110, $v_c$ and $v_s$ should ideally be fixed values. Here, since $v_s$ is the amount of frequency shift by the frequency shifter 112, $v_s$ can approximately be regarded as the fixed value by using a device with a stable shift amount as the frequency shifter 112.

On the other hand, since $v_c$ corresponds to an optical length of the cavity of the laser apparatus 110, it may change due to environmental fluctuations such as temperature. For example, if the laser apparatus 110 is the fiber ring laser, as described in FIG. 2, and the cavity is formed by optical fibers, the cavity length may change by approximately 10 ppm when an ambient temperature changes by one degree Celsius. It should be noted that even if the laser apparatus 110 is a solid-state laser such as a semiconductor laser or the like, the cavity length may be changed by such environmental fluctuations. Therefore, the cavity frequency extraction part 170 extracts the cavity frequency corresponding to the cavity length in order to monitor such a change in the cavity length. The cavity frequency extraction part 170 will be described below.

Configuration Example of the Cavity Frequency Extraction Part 170

Figure 7:
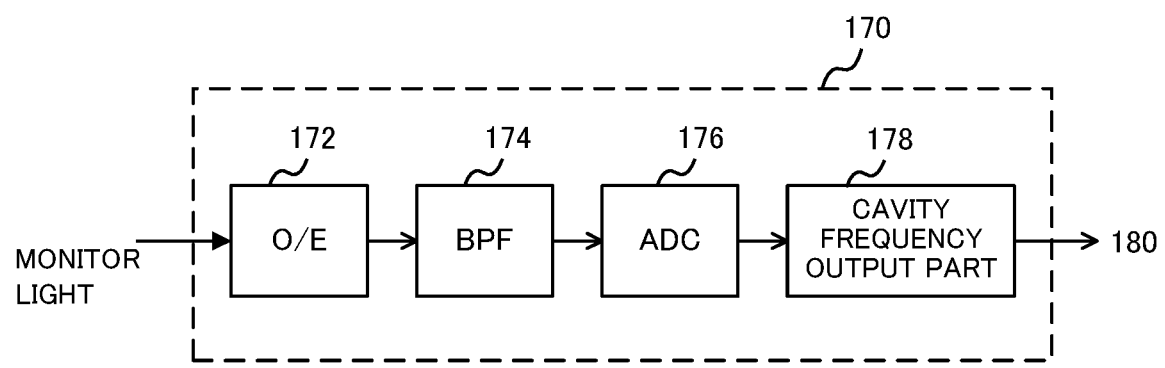
FIG. 7 shows a configuration example of a cavity frequency extraction part 170 according to the present embodiment.

FIG. 7 shows a configuration example of the cavity frequency extraction part 170 according to the present embodiment. The cavity frequency extraction part 170 includes a photoelectric conversion part and extracts the signal component corresponding to the cavity frequency of the optical cavity from electrical signals converted by the photoelectric conversion part. The cavity frequency extraction part 170 includes a third photoelectric conversion part 172, a third filter part 174, a third AD converter 176, and a cavity frequency output part 178.

The third photoelectric conversion part 172 converts the monitor light into an electrical signal. The third photoelectric conversion part 172 may be a photodiode or the like. As described in FIG. 3, the laser apparatus 110 outputs the frequency modulated laser beam having the plurality of longitudinal modes arranged at frequency intervals which approximately match with the cavity frequency $v_c$. Therefore, when the third photoelectric conversion part 172 performs a photoelectrical conversion on the frequency-modulated laser beam, an electrical signal including the cavity frequency $v_c$ is output.

The third filter part 174 passes, within the electrical signal converted by the third photoelectric conversion part 172, a signal component having the cavity frequency $v_c$ of the optical cavity. The third filter part 174 has, for example, at least one of a high-pass filter, a low-pass filter, a band-pass filter, and a band-rejection filter. FIG. 7 shows an example in which the third filter part 174 is the band-pass filter.

The third AD converter 176 converts analog signals to be input into digital signals. The third AD converter 176 converts analog signals into digital signals in synchronization with a clock signal having a frequency greater than or equal to twice the cavity frequency $v_c$. The third AD converter 176, for example, operates when receiving the clock signal from the first clock signal supplying part 210.

The cavity frequency output part 178 performs the frequency analysis on the signal components passing through the third filter part 174. The cavity frequency output part 178 first converts the digital signal output from the third AD converter 176 into frequency data. As an example, the cavity frequency output part 178 performs a digital Fourier transform (DFT) on the digital signal. Then, the cavity frequency output part 178 frequency-analyzes the frequency data and outputs the cavity frequency $v_c$. The cavity frequency output part 178 outputs, as the cavity frequency $v_c$, a frequency at which the signal intensity of the frequency data is the largest, for example.

As described above, the cavity frequency extraction part 170 shown in FIG. 7 extracts the cavity frequency $v_c$ from the monitor light and outputs it. Therefore, even if the cavity length of the laser apparatus 110 changes due to a fluctuation in the ambient temperature, the cavity frequency extraction part 170 can extract and output the cavity frequency $v_c$ which corresponds to the change. Since the calculation part 180 uses the fixed value $v_s$, $v_B(m, d)$ detected in the above-described manner, and the cavity frequency $v_c$, it is possible to calculate a distance d corresponding to the fluctuation in the ambient temperature.

As described above, even if environmental fluctuations occur, the measurement apparatus 100 can suppress the reduction of measurement accuracy, since the measurement apparatus 100 monitors the cavity frequency $v_c$ corresponding to the environmental fluctuations and reflects the cavity frequency $v_c$ in the calculation of the distance d. Alternatively or additionally, the laser apparatus 110 may be placed in a temperature-stabilized controlled chamber, such as a thermostatic chamber, to reduce influence of environmental fluctuations and to suppress the reduction of measurement accuracy of the measurement apparatus 100.

However, since the measurement apparatus 100 in which temperature stability is controlled tends to be a large-scale apparatus, problems such as increases in cost, increased effort needed for circuit adjustment or the like, and increased installation area or the like may occur. Further, when the observation result of the cavity frequency corresponding to the change in the cavity length is used for distance measurement, measurement variation of the cavity frequency is superposed on distance measurement variation, and the distance measurement variation sometimes became large. Here, the measurement variation of the cavity frequency is defined as $\Delta v_c$.

In this case, the measurement variation $\Delta v_c$ can be reduced by observing the cavity frequency $v_c$ multiple times and then averaging them, but the measurement time becomes longer by performing the observation multiple times, and throughput of the measurement apparatus 100 is reduced. Therefore, the measurement apparatus according to the present embodiment can reduce the measurement variation $\Delta v_c$ of the cavity frequency while suppressing such a reduction in throughput, thereby enabling the measurement of a distance with high accuracy. Next, such a measurement apparatus will be described.

Configuration Example of a Measurement Apparatus 300

Figure 8:
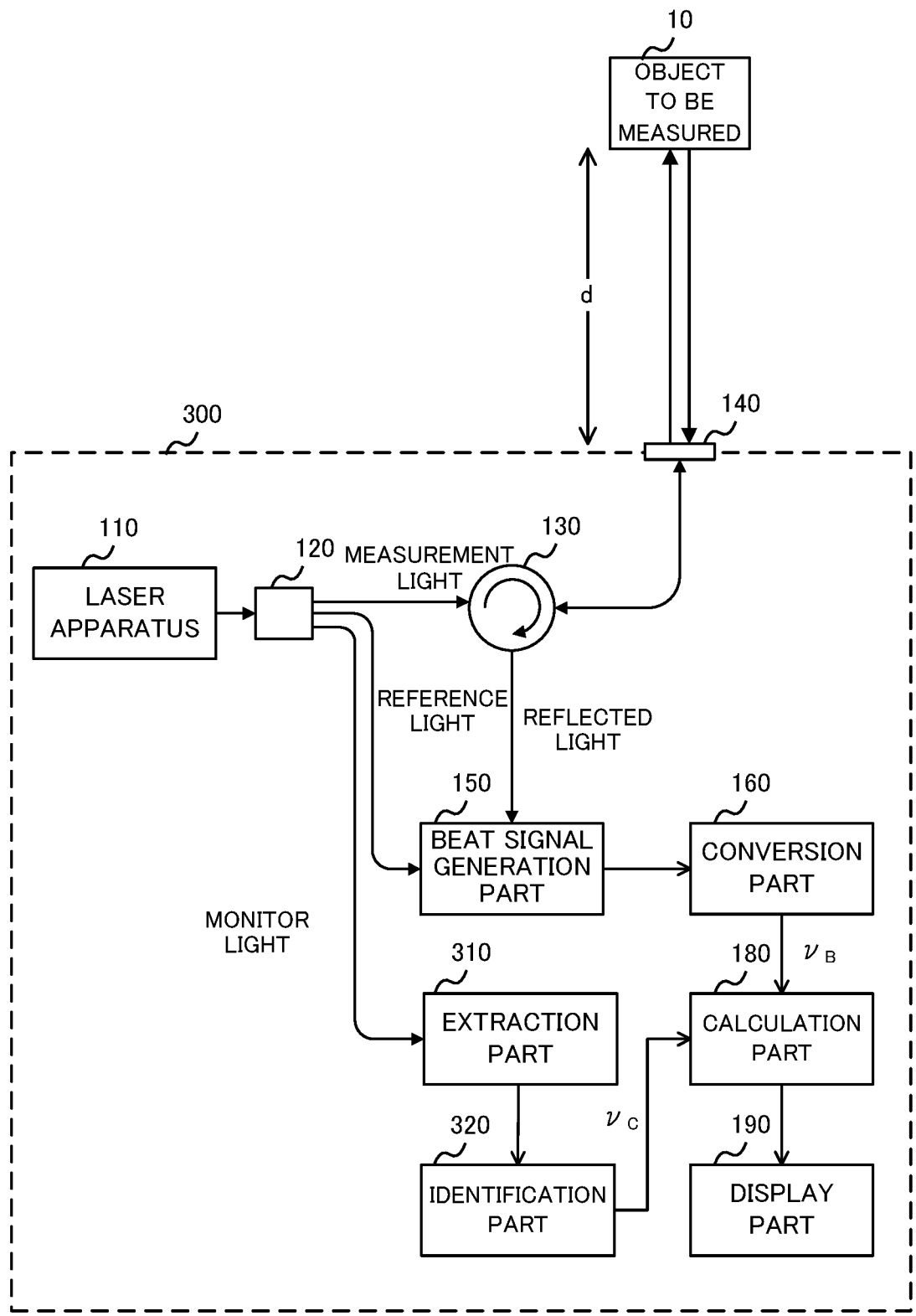
FIG. 8 shows a configuration example of the measurement apparatus 300 according to the present embodiment together with the object to be measured 10.

FIG. 8 shows a configuration example of a measurement apparatus 300 according to the present embodiment together with the object to be measured 10. In the measurement apparatus 300 shown in FIG. 8, operations approximately the same as those of the measurement apparatus 100 according to the present embodiment shown in FIG. 1 are denoted by the same reference numerals, and descriptions thereof are omitted. The measurement apparatus 300 further includes an extraction part 310 and an identification part 320 in place of the cavity frequency extraction part 170 of the measurement apparatus 100.

In a similar manner as with the cavity frequency extraction part 170, the extraction part 310 and the identification part 320 identify the cavity frequency $v_c$ of the laser apparatus 110. Here, the extraction part 310 and the identification part 320 quickly identify the cavity frequency $v_c$ while reducing the measurement variation $\Delta v_c$. Next, a more detailed configuration of the extraction part 310 and the identification part 320 will be described.

Configuration Example of the Extraction Part 310 and the Identification Part 320

Figure 9:
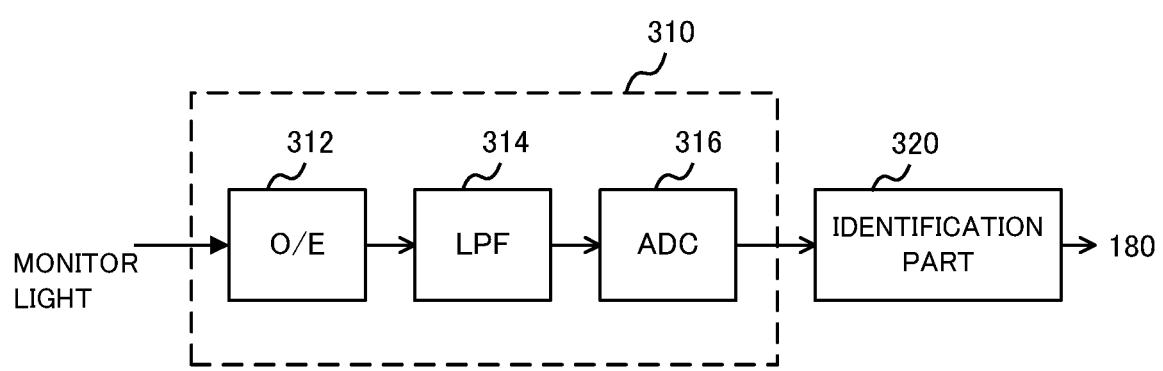
FIG. 9 shows a configuration example of an extraction part 310 and an identification part 320 according to the present embodiment.

FIG. 9 shows a configuration example of the extraction part 310 and the identification part 320 according to the present embodiment. The extraction part 310 extracts a signal component including a plurality of self-beat signals based on the main lobe from an electrical signal generated by converting the monitor light. The extraction part 310 includes a fourth photoelectric conversion part 312, a fourth filter part 314, and a fourth AD converter 316.

The fourth photoelectric conversion part 312 converts the monitor light into an electrical signal. The fourth photoelectric conversion part 312 may be a photodiode or the like, in a similar manner as the third photoelectric conversion part 172. As described with reference to FIG. 3, the laser apparatus 110 outputs the frequency-modulated laser beam having the longitudinal modes of the main lobe arranged at frequency intervals which approximately match with the cavity frequency $v_c$. In other words, the electrical signal output from the fourth photoelectric conversion part 312 includes a plurality of self-beat signals based on the main lobe of the laser beam.

The plurality of self-beat signals based on the main lobe are arranged at frequency intervals which approximately match with the cavity frequency $v_c$, in a similar manner as with the main lobe of the laser beam. Here, supposing that the peak frequency of the $n_c$-th self-beat signal is $v_c(n_c)$, the following equation is established from $v_c(n_c) = n_c \cdot v_c$. Here, $n_c$ is the order of the self-beat signal based on the main lobe.

$$v_c = \frac{v_c(n_c)}{n_c} \qquad \text{[Equation 7]}$$

Here, in actuality, an ideal $v_c(n_c)$ for Equation 7 is $v_c(n_c) + \Delta v_c$ because the measurement result of the self-beat signals includes the measurement variation $\Delta v_c$. Therefore, when the cavity frequency $v_c$ is calculated by measuring the high-order self-beat signal $v_c(n_c)$, with a large $n_c$, it can be understood that the measurement variation $\Delta v_c$ included in the measurement result is reduced to about a value of $1/n_c$. In other words, just by measuring the self-beat signals with an order $n_c$ of 2 or higher once with the extraction part 310 and the identification part 320, the measurement variation $\Delta v_c$ can be reduced to $1/n_c$.

Therefore, the fourth filter part 314 and the fourth AD converter 316 extract high-order self-beat signals among the plurality of self-beat signals and convert them into digital signals. The fourth filter part 314 passes, within the electrical signal converted by the fourth photoelectric conversion part 312, a signal component including a frequency greater than or equal to twice the cavity frequency $v_c$ of the optical cavity.

The fourth filter part 314 has, for example, at least one of a high-pass filter, a low-pass filter, a band-pass filter, and a band rejection filter. FIG. 9 shows an example in which the fourth filter part 314 is the low-pass filter. For example, the fourth filter part 314 passes a signal component including a frequency of about ½ of a clock frequency of the fourth AD converter 316. Thus, the fourth filter part 314 can extract the highest-order self-beat signal in a range in which the fourth AD converter 316 is operated.

The fourth AD converter 316 converts input analog signals into digital signals. The fourth AD converter 316 converts analog signals into digital signals in synchronization with a clock signal having a frequency greater than or equal to $2n_c$-times the cavity frequency $v_c$, for example.

The identification part 320 identifies the cavity frequency $v_c$ of the optical cavity on the basis of the signal component extracted by the extraction part 310. The identification part 320 converts the digital signals output from the fourth AD converter 316 into frequency data. The identification part 320 performs a digital Fourier transform (DFT) on the digital signals, for example. The identification part 320 analyzes the frequency data and identifies the frequency $n_c \cdot v_c$ of the self-beat signal.

For example, the identification part 320 performs a signal-intensity peak detection on the frequency data, and identifies a frequency corresponding to a peak as the frequency $n_c \cdot v_c$ of the self-beat signal. It should be noted that when there are a plurality of peaks in the frequency data, the identification part 320 may identify the frequency $n_c \cdot v_c$ of the self-beat signal by searching for a peak near a predetermined frequency. It is desirable that a value of $n_c$ is defined at the time of designing a passband of the fourth filter part 314. In this case, a value near the frequency of the self-beat signal to be measured can be predetermined by estimating $n_c \cdot v_c$ of the designed value.

The identification part 320 identifies the cavity frequency $v_c$ of the optical cavity by dividing the identified frequency $n_c \cdot v_c$ by $n_c$. It should be noted that it is desirable that the value of $n_c$ is stored in advance in the storage unit or the like. The identification part 320 supplies the identified cavity frequency $v_c$ to the calculation part 180.

As described above, by measuring the monitor light once, the extraction part 310 and the identification part 320 according to the present embodiment output the cavity frequency $v_c$ measured by reducing the measurement variation $\Delta v_c$ to $1/n_c$. It is also possible to reduce the measurement variation $\Delta v_c$ to $1/(k \cdot n_c)$ by having the extraction part 310 and the identification part 320 perform the measurement k times ($k \geq 1$).

As described above, even if the cavity length of the laser apparatus 110 changes due to a fluctuation in ambient temperature, the extraction part 310 and the identification part 320 can quickly measure the highly accurate cavity frequency $v_c$ and output it. Then, the calculation part 180 calculates a difference between the propagation distances of the reference light and the measurement light on the basis of the optical cavity and the cavity frequency $v_c$ of the laser cavity identified by the identification part 320. Since the calculation part 180 uses the fixed value $v_s$ the detected $v_B(m, d)$, and the cavity frequency $v_c$ measured with high accuracy, it is possible to calculate a distance d corresponding to the fluctuation in the ambient temperature.

As described above, the measurement apparatus 300 according to the present embodiment can measure the distance with high accuracy while suppressing the reduction of throughput by using the high-order self-beat signals among the plurality of self-beat signals based on the main lobe, but it is not limited thereto. The measurement apparatus 300 may use self-beat signals based on side lobes when the laser apparatus 110 outputs the side lobes, for example. Next, such a measurement apparatus 300 will be described.

In FIG. 2, it has been described that the laser apparatus 110 has the frequency shifter 112 in the cavity. As the frequency shifter 112, the above-described AOFS is known. The laser apparatus 110 using the AOFS, as described in FIG. 3, outputs the main lobe. In place of such an AOFS, an optical SSB modulator may be used as the frequency shifter 112.

Configuration Example of an Optical SSB Modulator 30

Figure 10:
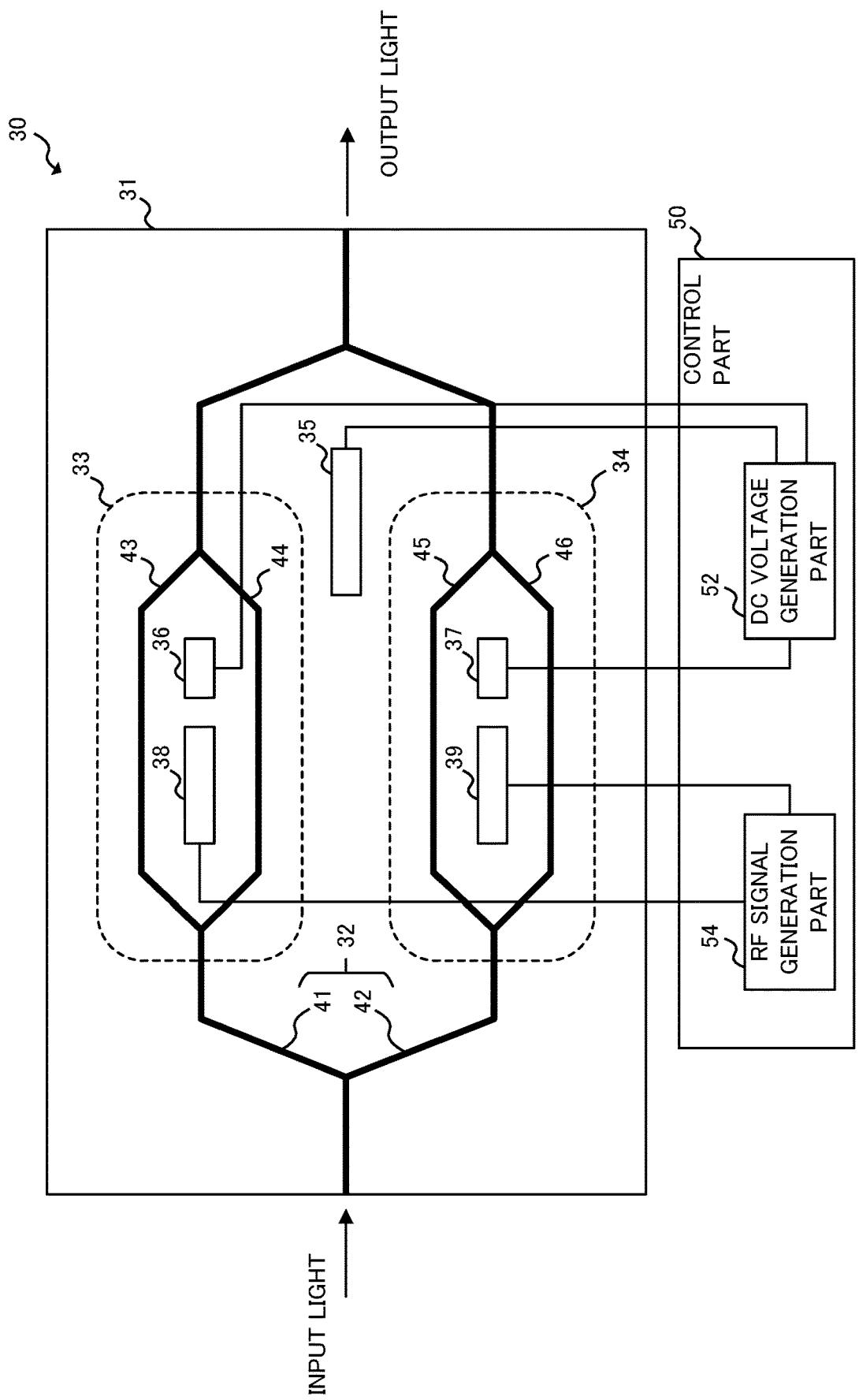
FIG. 10 shows a configuration example of an optical SSB modulator 30 and a control part 50 according to the present embodiment.

FIG. 10 shows a configuration example of an optical SSB modulator 30 and a control part 50 according to the present embodiment. The optical SSB modulator 30 includes a substrate 31, a main Mach-Zehnder waveguide 32, a first sub Mach-Zehnder waveguide 33, a second sub Mach-Zehnder waveguide 34, a main DC electrode 35, a first sub DC electrode 36, a second sub DC electrode 37, a first RF electrode 38, and a second RF electrode 39.

The substrate 31 is a substrate at least partially formed of an electro-optical crystal, and includes an LiNbO$_3$ crystal, for example. On a surface of such a substrate 31, a waveguide and the substrate are formed. The main Mach-Zehnder waveguide 32 splits the light, which is input to the optical SSB modulator 30, into two, and outputs the branched lights after multiplexing them. The main Mach-Zehnder waveguide 32 has a first arm waveguide 41 that passes one of the branched lights and the second arm waveguide 42 that passes the other branched light.

The first arm waveguide 41 includes the first sub Mach-Zehnder waveguide 33. The first sub Mach-Zehnder waveguide 33 splits, into two, the light which the first arm waveguide 41 passes, and outputs the branched lights to the first arm waveguide 41 after multiplexing them. The first sub Mach-Zehnder waveguide 33 has a first sub arm waveguide 43 and a second sub arm waveguide 44 that pass the input light.

The second arm waveguide 42 includes the second sub Mach-Zehnder waveguide 34. The second sub Mach-Zehnder waveguide 34 splits, into to two, the light which the second arm waveguide 42 passes, and outputs to the branched lights to the second arm waveguide 42 after multiplexing them. The second sub Mach-Zehnder waveguide 34 has a third sub arm waveguide 45 and a fourth sub arm waveguide 46 that pass the input light.

The main DC electrode 35, as an example, is provided at a position approximately the same distance from each of the first arm waveguide 41 and the second arm waveguide 42 of the main Mach-Zehnder waveguide 32. A DC voltage is supplied from the control part 50 to the main DC electrode 35.

The first sub DC electrode 36 and the first RF electrode 38, as an example, are provided at a position approximately the same distance from each of the first sub arm waveguide 43 and the second sub arm waveguide 44 of the first sub Mach-Zehnder waveguide 33. The first sub DC electrode 36 and the first RF electrode 38 may be separate electrodes or may be one common electrode.

Similarly, the second sub DC electrode 37 and the second RF electrode 39, as an example, are provided at a position approximately the same distance from each of the third sub arm waveguide 45 and the fourth sub arm waveguide 46 of the second sub Mach-Zehnder waveguide 34. The second sub DC electrode 37 and the second RF electrode 39 may be separate electrodes or may be one common electrode.

A DC voltage is supplied from the control part 50 to the first sub DC electrode 36 and the second sub DC electrode 37. An RF signal is supplied from the control part 50 to the first RF electrode 38 and the second RF electrode 39. The RF signal is, for example, a high frequency signal of several GHz to tens of GHz.

As such, when the voltage is applied to the electrode provided near the waveguide that passes the input light, an electro-optic effect (Pockels effect) that changes the refractive index of the waveguide is produced. The amplitude intensity level and the phase of the light passing through the waveguide in which the electro-optic effect has occurred experience modulation, offset, etc. corresponding to the applied voltage. Since change in the refractive index due to such an electro-optic effect corresponds to an application direction of an electric field, for example, it is possible to switch the change direction of the phase simply by changing the positive or negative sign of the voltage applied to the electrode.

The control part 50 adjusts the phase of the light passing through the waveguide by supplying the DC voltage and the RF signal to a plurality of electrodes of the optical SSB modulator 30. The control part 50 has a DC voltage generation part 52 and an RF signal generation part 54. The DC voltage generation part 52 generates a DC voltage and supplies the DC voltage to the main DC electrode 35, the first sub DC electrode 36, and the second sub DC electrode 37. The RF signal generation part 54 generates the RF signal and supplies the RF signal to the first RF electrode 38 and the second RF electrode 39.

The control part 50 controls the DC voltage generation part 52 and the RF signal generation part 54 to supply the DC voltage and the RF signal to the optical SSB modulator 30, and adjusts the frequency shift direction and the frequency shift amount. For example, the control part 50 shifts the frequency of the light input to the optical SSB modulator 30 by the frequency of the RF signal. The control part 50 may further set the frequency shift amount of the optical SSB modulator 30 by changing the frequency of the RF signal.

Further, the control part 50 switches the frequency shift direction by supplying the DC voltage of a predetermined value to the main DC electrode 35, the first sub DC electrode 36, and the second sub DC electrode 37 that are provided on the substrate 31 and correspond to the main Mach-Zehnder waveguide 32, the first sub Mach-Zehnder waveguide 33, and the second sub Mach-Zehnder waveguide 34. Since such switching of the frequency shift and the shift direction of the optical SSB modulator 30 are described in known Patent Documents 2 and 3, detailed description thereof is omitted here.

The laser apparatus 110 according to the present embodiment may use the optical SSB modulator 30 described above as the frequency shifter 112. The control part 50 sets the frequency of the RF signal supplied to the optical SSB modulator 30, thereby making it possible to set a frequency shift amount of the optical SSB modulator 30. Further, the control part 50 may switch the voltage supplied to the optical SSB modulator 30, thereby making it possible to switch the frequency shift direction of the optical SSB modulator 30 to one of the positive side or the negative side.

An Example of a Light Spectrum Output by the Optical SSB Modulator 30

Figure 11:
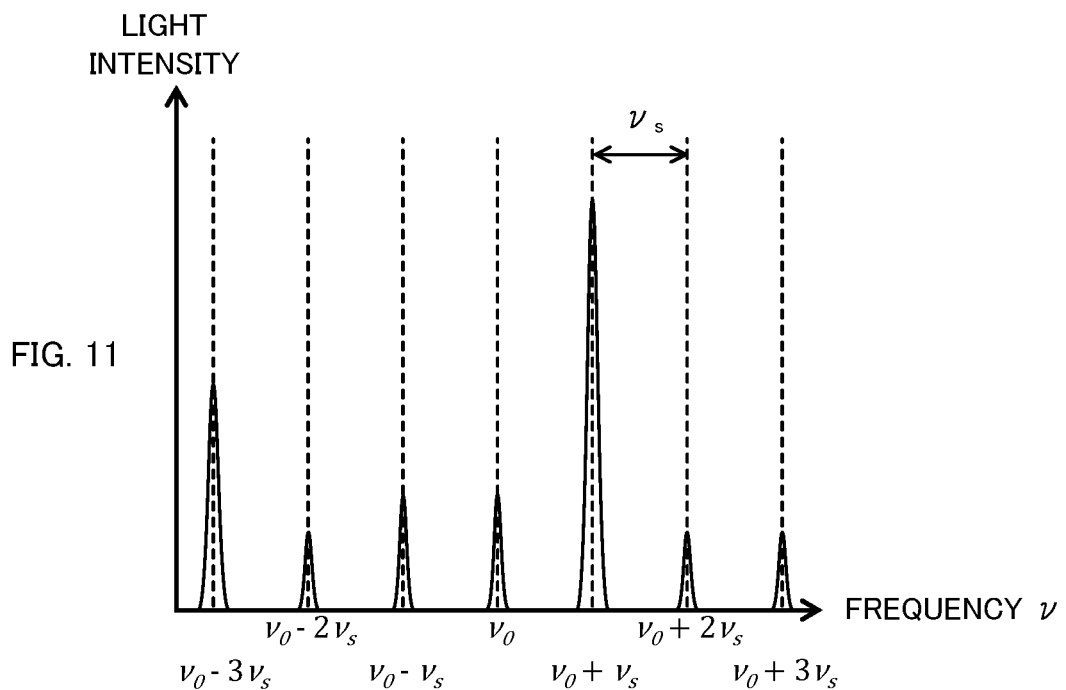
FIG. 11 shows an example of a light spectrum output from the optical SSB modulator 30 according to the present embodiment.

FIG. 11 shows an example of a light spectrum output from the optical SSB modulator 30 according to the present embodiment. In FIG. 11, the horizontal axis indicates the frequency of the light, the vertical axis indicates the light intensity. FIG. 11 shows an exemplary case in which light having a frequency $v_0$ is input to the optical SSB modulator 30, and the optical SSB modulator 30 outputs light having a frequency $v_0+v_s$ by shifting the frequency of the input light by $v_s$. Here, the output light having the frequency $v_0+v_s$ is called a main lobe.

In addition to the main lobe, the optical SSB modulator 30 generates a plurality of side lobes at frequency positions apart from the frequency of the main lobe by $v_s$. In other words, output lights arranged by the shift frequency $v_s$ from the frequency $v_0+v_s$ of the main lobe are called side lobes. FIG. 11 shows side lobes having the frequencies from $v_0-3v_s$ to $v_0$ generated on the negative side of the main lobe and side lobes having the frequencies $v_0+2v_s$ and $v_0+3v_s$ generated on the positive side of the main lobe. As described above, the laser apparatus 110 that has the frequency shifter 112, which generates the side lobes, in the cavity will be described below.

Example of a Laser Beam Output from the Laser Apparatus 110

Figure 12:
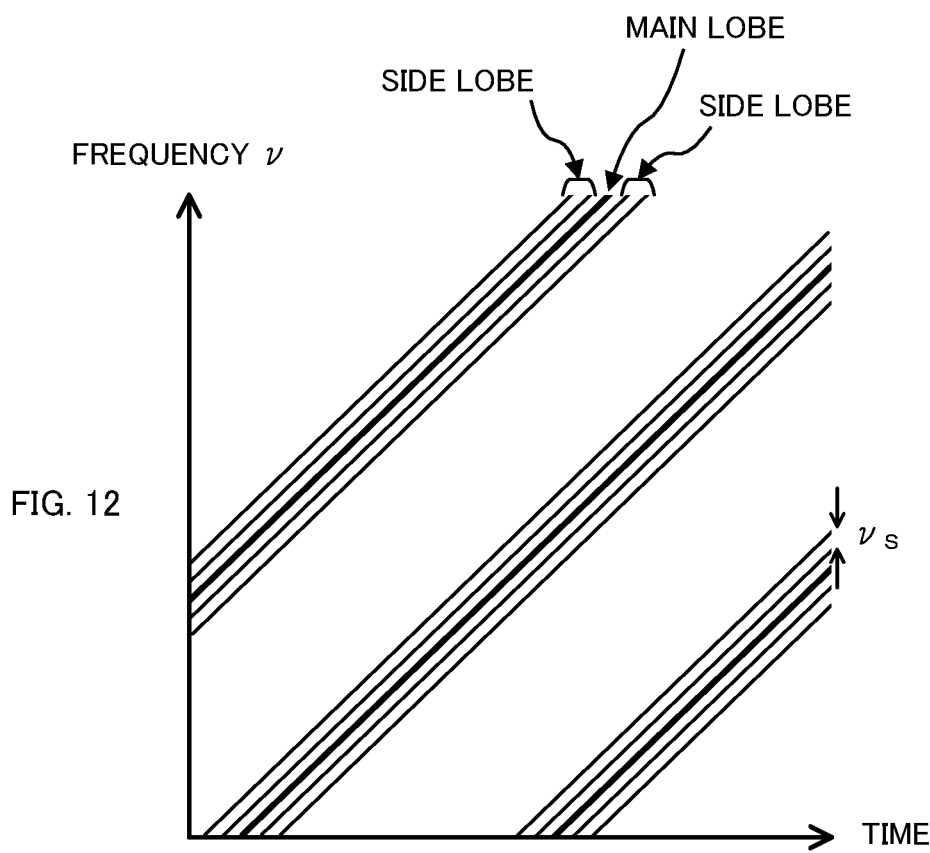
FIG. 12 shows an example of a laser beam output from the laser apparatus 110 having the optical SSB modulator 30 shown in FIG. 10.

FIG. 12 shows an example of a laser beam output from the laser apparatus 110 having the optical SSB modulator 30 shown in FIG. 10. In FIG. 12, the horizontal axis indicates the time and the vertical axis indicates the frequency of light. FIG. 12 shows changes in frequencies of the main lobe and the side lobes output from the laser apparatus 110 over time. A change over time in the frequency of the main lobe is the same as the change in the main lobe described with reference to FIG. 3. Therefore, even with such a laser apparatus 110, the distance d between the optical head part 140 and the object to be measured 10 can be calculated using Equation 6.

In a similar manner as with the main lobe, a frequency of a side lobe changes by $v_s$ due to the frequency shifter 112 each time the side lobe goes around the cavity. Therefore, the change over time in the frequency of the side lobe is the same as the change of the main lobe. When the laser apparatus 110 having the optical SSB modulator 30 is used, monitor light of the light spectrum as shown in FIG. 12 is input to the extraction part 310. Then, the fourth photoelectric conversion part 312 converts the monitor light into an electrical signal. In the electrical signal output from the fourth photoelectric conversion part 312, a plurality of self-beat signals based on the main lobe and the side lobes of the laser beam are generated.

First Example of a Self-Beat Spectrum

Figure 13:
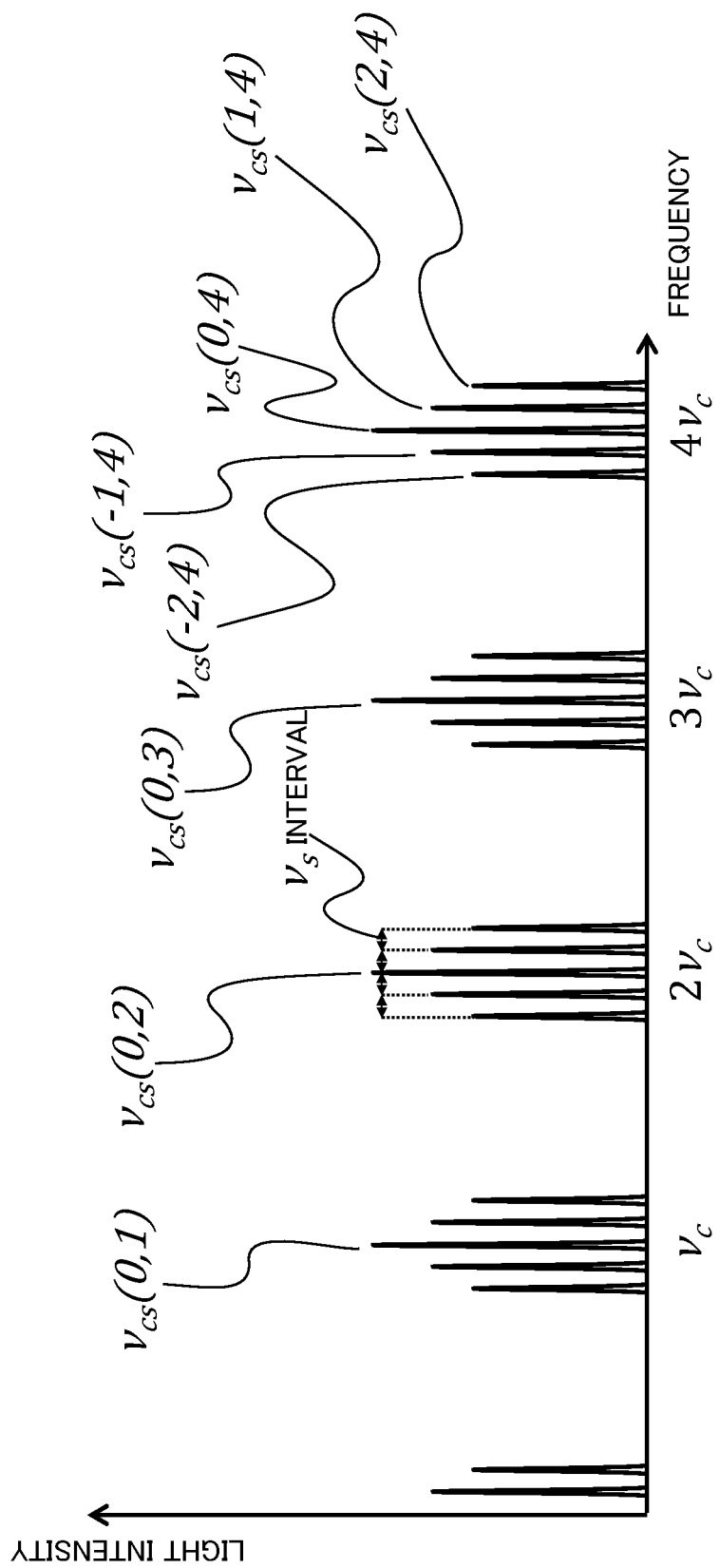
FIG. 13 shows a first example of a self-beat spectrum of the laser beam output from the laser apparatus 110 having the optical SSB modulator 30 shown in FIG. 10.

FIG. 13 shows a first example of a self-beat spectrum of the laser beam output from the laser apparatus 110 having the optical SSB modulator 30 shown in FIG. 10. In other words, FIG. 13 shows an example of the electrical signal output from the fourth photoelectric conversion part 312. In FIG. 13, the horizontal axis represents the frequency and the vertical axis represents the light intensity. The plurality of self-beat signals based on the main lobe are arranged at frequency intervals which approximately match with the cavity frequency $v_c$. The side lobes are arranged around the main lobe at frequency intervals which approximately match with the shifted frequency $v_s$.

Supposing that the peak frequency of such self-beat signals is $v_{cs}(n_s, n_c)$, then $v_{cs}(n_s, n_c)$ is expressed by the following equation. Here, $n_c$ represents the order of the self-beat signals based on the main lobe. $n_s$ represents the order of the self-beat signals based on the side lobes and represents the shift order of the frequency shifter.

$$v_{cs}(n_s, n_c) = n_s v_s + n_c v_c \quad \text{[Equation 8]}$$

In Equation 8, $n_c$ is an integer whose absolute value is 1 or more, and $n_s$ is an integer. When $n_s=0$, $v_{cs}(n_s, n_c)$ indicates the peak frequency of a self-beat signal based on the main lobe. For example, $v_{cs}(0, 2)$ is $2v_c$ and $v_{cs}(-2, 4)$ is $4v_c-2v_s$. From Equation 8, the cavity frequency $v_c$ is calculated as follows.

$$v_c = \frac{v_{cs}(n_s, n_c)}{n_c} - \frac{n_s}{n_c} v_s \quad \text{[Equation 9]}$$

Since the second term on the right side in Equation 9 is a constant, as described in Equation 7, when the cavity frequency $v_c$ is calculated by measuring the high-order self-beat signal $v_{cs}(n_s, n_c)$, with a large $n_c$, it can be understood that the measurement variation included in a measurement result is reduced to about a value of $1/n_c$. The measured variation can be reduced whether a self-beat signal $v_{cs}(n_s,$ $n_c)$ to be measured is based on the main lobe ($n_s=0$) or based on the side lobe ($n_s \neq 0$). Here, it can be seen that the condition for suppressing the reduction of throughput in the measurement apparatus 300 is that the absolute value of the order $n_c$ of the self-beat signal based on the main lobe is set to 2 or more, even in the measurement of the cavity frequency $v_c$ using the side lobe.

In other words, the measurement apparatus 300 shown in FIG. 8 can measure the distance with high accuracy while suppressing the reduction of throughput even by using the laser apparatus 110 that has, as the frequency shifter 112, the optical SSB modulator 30 which generates the side lobes, in the optical cavity and outputs the frequency-modulated laser beam with the plurality of modes of the main lobe and the side lobes. When the measurement apparatus 300 uses the self-beat signal based on the main lobe, the extraction part 310 and the identification part 320 may operate in the same manner as described above.

On the other hand, when the measurement apparatus 300 uses the self-beat signal based on the side lobe, the extraction part 310 extracts a signal component including the self-beat signal $v_{cs}(n_s, n_c)$ based on the side lobe from the electrical signal generated by converting the monitor light ($n_s \neq 0$). Then, the identification part 320 identifies the cavity frequency $v_c$ of the optical cavity using Equation 9 from the peak frequency $v_{cs}(n_s, n_c)$ included in the signal component extracted by the extraction part 310.

$n_c$ and $n_s$ are parameters that can be designed in advance. Therefore, as described above, the identification part 320 can identify the cavity frequency $v_c$ of the optical cavity on the basis of the signal component extracted by the extraction part 310. As a result, the calculation part 180 can accurately calculate the difference between the propagation distances of the reference light and the measurement light on the basis of the cavity frequencies $v_c$ of the optical cavity and the beat signal of the optical cavity.

In the measurement apparatus 300 according to the present embodiment described above, an example in which the extraction part 310 and the identification part 320 measure the frequency of the self-beat signal $v_{cs}(n_s, n_c)$ of the monitor light and identify the cavity frequency $v_c$ of the optical cavity from the measurement result has been described. Also, an example of the self-beat signal $v_{cs}(n_s, n_c)$ measured by the extraction part 310 and the identification part 320 is shown in FIG. 13, but the present disclosure is not limited to this.

The self-beat signal $v_{cs}(n_s, n_c)$ shown in FIG. 13 shows a case where $v_s < v_c$. Typically, the shift frequency $v_s$ of the optical SSB modulator 30 is about several GHz to tens of GHz, and the cavity frequency $v_c$ of the laser apparatus 110 is about tens of MHz to several hundred MHz. The measurement apparatus 300 may thus use the self-beat signal $v_{cs}(n_s, n_c)$ for a case where $v_s > v_c$.

Second and Third Examples of the Self-Beat Spectra

Figure 14:
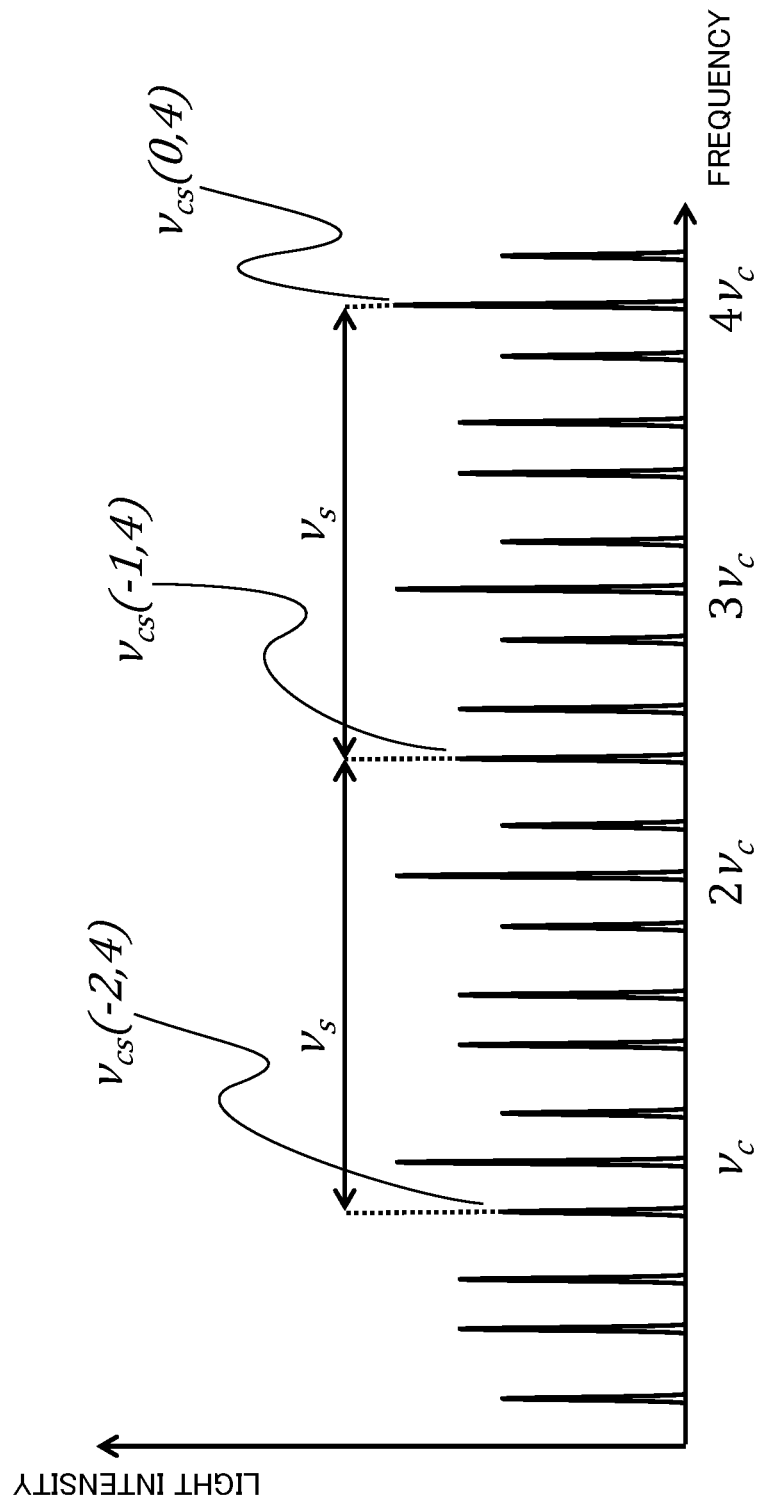
FIG. 14 shows a second example of the self-beat spectrum of the laser beam output from the laser apparatus 110 having the optical SSB modulator 30 shown in FIG. 10.
Figure 15:
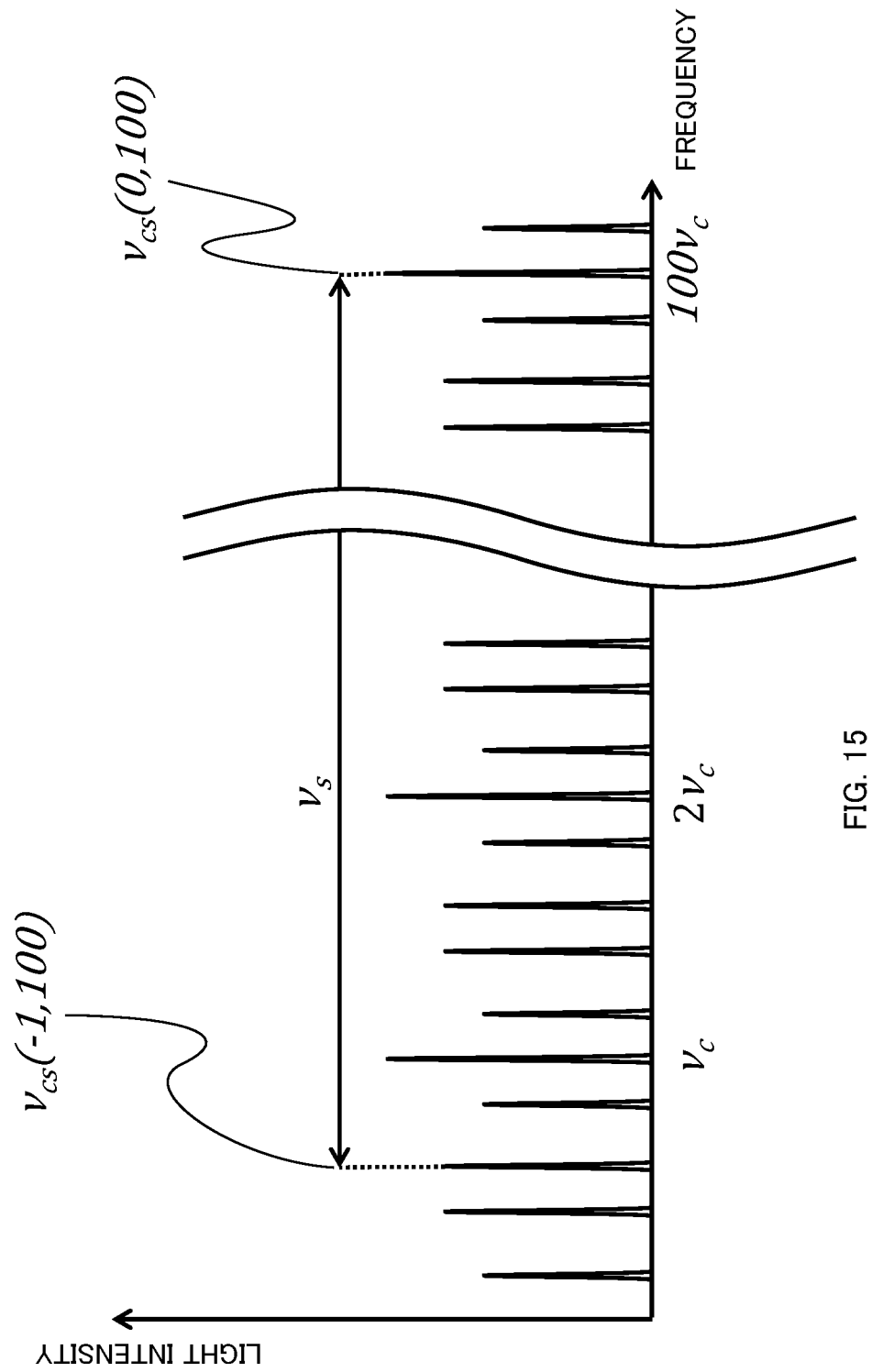
FIG. 15 shows a third example of the self-beat spectrum of the laser beam output from the laser apparatus 110 having the optical SSB modulator 30 shown in FIG. 10.

FIG. 14 shows a second example of the self-beat spectrum of the laser beam output from the laser apparatus 110 having the optical SSB modulator 30 shown in FIG. 10. The self-beat spectrum of the second example shows the frequency spectrum when $v_c < v_s < 2v_c$. Further, FIG. 15 shows a third example of the self-beat spectrum of the laser beam output from the laser apparatus 110 having the optical SSB modulator 30 shown in FIG. 10. The self-beat spectrum of the third example shows the frequency spectrum when $v_s$ is about 100 $v_c$.

From FIGS. 14 and 15, it can be seen that, among a plurality of self-beat signals $v_{cs}(n_s, n_c)$ when $v_s > v_c$, a self-beat signal having a frequency smaller than the cavity frequency $v_c$ and $|n_c| \geq 2$ is generated. For example, a frequency of a self-beat signal $v_{cs}(-2, 4)$ based on the side lobe in FIG. 14, and a frequency of a self-beat signal $v_{cs}(-1, 100)$ based on the side mode in FIG. 15 are smaller than the cavity frequency $v_c$.

When the self-beat signal $v_{cs}(n_s, n_c)$ can be processed at a lower frequency at the time of measuring it, designing, manufacturing, or the like of electrical circuits or the like of the extraction part 310 and the identification part 320 become easy. Therefore, it is desirable that the extraction part 310 and the identification part 320 measure a self-beat signal that satisfies $0 < v_{cs}(n_s, n_c) < v_c$. In this case, the fourth filter part 314 of the extraction part 310 is a filter that passes, within the electrical signal converted by the fourth photoelectric conversion part 312, a signal component that is less than the cavity frequency $v_c$ of the optical cavity.

By substituting an inequality of $0 < v_{cs}(n_s, n_c) < v_c$ into Equation 8, the following equation is obtained.

$$-n_s \frac{v_s}{v_c} < n_c < 1 - n_s \frac{v_s}{v_c} \qquad \text{[Equation 10]}$$

From Equation 10, is expressed as follows. Here, ceil( ) is a function representing taking the ceiling (rounding up).

$$n_c = \text{ceil}\left(-n_s \frac{v_s}{v_c}\right) \qquad \text{[Equation 11]}$$

[Conditions of $n_s$]

FIG. 16 shows a result of summarizing conditions of $n_s$ in which the absolute value of such an is equal to or greater than 2, for each range of $v_s$. For example, when $v_s = 1$ GHz, $v_c = 90$ MHz, $n_s = 1$, and $n_c = -11$, a frequency of a self-beat signal $v_{cs}(1, -11)$ is 10 MHz. By measuring an electrical signal of about 10 MHZ, the extraction part 310 and the identification part 320 can reduce measurement variation to about 1/11 of the conventional measurement variation. In other words, the extraction part 310 and the identification part 320 can measure the cavity frequency $v_c$ with approximately 11 times the sensitivity.

It is preferable that the frequency of the self-beat signal $v_{cs}(n_s, n_c)$ to be measured by the extraction part 310 and the identification part 320 is separated from frequencies of other self-beat signals. For example, if the frequency of the self-beat signal $v_{cs}(n_s, n_c)$ to be measured and the frequencies of other self-beat signals overlap to the degree that they cannot be separated, an error would occur in an identification result of the identification part 320. Therefore, it is desirable to set an appropriate shift-frequency $v_s$ at the time of designing the optical SSB modulator 30, for example.

In addition, it is preferable that the measurement apparatus 300 be capable of appropriately adjusting the shift-frequency $v_s$ of the optical SSB modulator 30. For example, the identification part 320 may be configured to change the frequency shift amount of the optical SSB modulator 30 by sending a control signal for changing the frequency of the RF signal to the control part 50.

In this case, the identification part 320 converts the signal component extracted by the extraction part 310 into frequency data, and compares a peak detection result of the converted frequency data and a peak detection result after changing the frequency shift amount of the optical SSB modulator 30, for example. The identification part 320 may repeat operations of changing the frequency shift amount and obtaining the peak detection result after the changing, multiple times. By doing this, the identification part 320 can identify that the self-beat signal $v_{cs}(n_s, n_c)$ to be measured is separated in frequency from other self-beat signals by a threshold value or more.

At least a part of the control part 50, the conversion part 160, the cavity frequency output part 178, the calculation part 180, and the identification part 320 of the measurement apparatus 100 and the measurement apparatus 300 according to the present embodiment described above is formed, for example, by an integrated circuit or the like. For example, the control part 50, the conversion part 160, the cavity frequency output part 178, the calculation part 180, and the identification part 320 includes, for example, a field programmable gate array (FPGA), a digital signal processor (DSP), and/or a central processing unit (CPU).

When at least a part of the control part 50, the conversion part 160, the cavity frequency output part 178, the calculation part 180, and the identification part 320 is formed by a computer or the like, the measurement apparatus 100 and the measurement apparatus 300 include a storage unit. The storage unit includes, for example, a read only memory (ROM) storing a basic input output system (BIOS) or the like of a computer or the like that realizes the control part 50, the conversion part 160, the cavity frequency output part 178, the calculation part 180, and the identification part 320, and a random access memory (RAM) serving as a work area. The storage unit may also store various pieces of information including an operating system (OS), application programs, and/or a database to be referred to at the time of executing the application programs. That is, the storage unit may include a large-capacity storage device like a hard disk drive (HDD) and/or a solid state drive (SSD).

The computer or the like includes a processor such as a CPU, and functions as at least a part of the control part 50, the conversion part 160, the cavity frequency output part 178, the calculation part 180, and the identification part 320 by executing a program stored in the storage unit. The computer or the like may include a graphics processing unit (GPU) or the like.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically distributed or integrated. Further, new exemplary embodiments generated by arbitrary combinations of them are included in the exemplary embodiments of the present disclosure. Further, effects of the new embodiment brought by the combinations also have the effect of the original exemplary embodiment together.

What is claimed is:

1. A measurement apparatus comprising:
    a laser apparatus, having a frequency shifter in an optical cavity, that outputs a frequency-modulated laser beam with a plurality of modes of a main lobe;
    a branch that splits the frequency-modulated laser beam output from the laser apparatus into a reference light, a measurement light, and a monitor light;

a beat signal generator that generates a beat signal by mixing the reference light and a reflected light that is reflected by radiating the measurement light onto an object to be measured;

extraction circuitry configured to extract a signal component including a plurality of self-beat signals based on the main lobe from an electrical signal generated by converting the monitor light;

identification circuitry configured to identify a cavity frequency of the optical cavity on the basis of the signal component extracted by the extraction circuitry; and calculation circuitry configured to calculate a difference between propagation distances of the reference light and the measurement light on the basis of the cavity frequency of the optical cavity identified by the identification circuitry and the beat signal to generate a measurement.

2. The measurement apparatus according to claim 1, wherein the extraction circuitry includes,
a photoelectric converter that converts the monitor light into the electrical signal, and
a filter that passes, within the electrical signal, signal components including a frequency at least greater than or equal to twice the cavity frequency of the optical cavity.

3. The measurement apparatus according to claim 1, wherein, when the cavity frequency of the optical cavity is $v_c$, an order higher than or equal to 2 of the self-beat signals based on the main lobe is $n_c$, and a peak frequency of a $n_c$-th self-beat signal is $v_c(n_c)$, the identification circuitry is further configured to identify the cavity frequency of the optical cavity using equation:

$$v_c = \frac{v_c(n_c)}{n_c}. \tag{1}$$

4. The measurement apparatus according to claim 1, wherein
the frequency shifter is an optical SSB modulator that generates a side lobe in the optical cavity,
the laser apparatus outputs the frequency-modulated laser beam with a plurality of modes of the main lobe and the side lobe, and
the extraction circuitry is further configured to extract the signal component including self-beat signals based on the side lobe from the electrical signal generated by converting the monitor light.

5. The measurement apparatus according to claim 4, wherein
the extraction circuitry includes
a photoelectric converter that converts the monitor light into the electrical signal, and
a filter that passes, within the electrical signal, signal components that are less than the cavity frequency of the optical cavity.

6. The measurement apparatus according to claim 4, wherein, when the cavity frequency of the optical cavity is $v_c$, a shift frequency of the frequency shifter is $v_s$, an order of the self-beat signal based on the main lobe is $n_c$, the shift order of the frequency shifter is $n_s$, and a peak frequency included in the signal component extracted by the extraction circuitry is $v_{cs}(n_s, n_c)$, the identification circuitry is further configured to identify the cavity frequency $v_c$ of the optical cavity using the following equation:

$$v_c = \frac{v_{cs}(n_s, n_c)}{n_c} - \frac{n_s}{n_c} v_s. \tag{2}$$

7. The measurement apparatus according to claim 6, wherein the absolute value of the order $n_c$ of the self-beat signal based on the main lobe is equal to or greater than 2.

8. The measurement apparatus according to claim 7, wherein the order $n_c$ of the self-beat signal based on the main lobe satisfies equation:

$$n_c = \mathrm{ceil}\left(-n_s \frac{v_s}{v_c}\right) \tag{3}$$

where ceil( ) is a function representing taking a ceiling by rounding up.

9. The measurement apparatus according to claim 1, wherein
the calculation circuitry is further configured to calculate a difference d in propagation distances between the reference light and the measurement light with equation:

$$d = \frac{c}{2 v_s v_c} \{v_B(m, d) + m v_c\} \tag{4}$$

using a frequency $v_B(m, d)$ of the beat signal obtained by frequency-analyzing the beat signal, where c is speed of light and m is an interval of longitudinal mode numbers of the frequency-modulated laser beam.

10. A measurement method comprising:
outputting a frequency-modulated laser beam with a plurality of modes of a main lobe from a laser apparatus having a frequency shifter in an optical cavity;
splitting the frequency-modulated laser beam into a reference light, a measurement light, and a monitor light;
generating a beat signal by mixing the reference light and a reflected light that is reflected by radiating the measurement light onto an object to be measured;
converting the monitor light into an electrical signal;
extracting a signal component including a plurality of self-beat signals based on the main lobe from the electrical signal;
identifying a cavity frequency of the optical cavity based on the extracted signal component; and
calculating a difference between propagation distances of the reference light and the measurement light on the basis of the identified cavity frequency of the optical cavity and the beat signal to generate a measurement.

11. The measurement method according to claim 10, further comprising:
generating, using the frequency shifter, which is an optical SSB modulator, a side lobe in the optical cavity, wherein
the outputting of the frequency-modulated laser beam further comprises outputting the frequency-modulated laser beam with a plurality of modes of the main lobe and the side lobe, and
the extracting of the signal component further comprises extracting the signal component including self-beat signals based on the side lobe from the electrical signal.

12. The measurement method according to claim 10, wherein the extracting further comprises:

converting, using a photoelectric converter, the monitor light into the electrical signal, and passing, using a filter and within the electrical signal, signal components including a frequency at least greater than or equal to twice the cavity frequency of the optical cavity.

13. The measurement method according to claim 10, wherein, when the cavity frequency of the optical cavity is $v_c$, an order higher than or equal to 2 of the self-beat signals based on the main lobe is $n_c$, and a peak frequency of a $n_c$-th self-beat signal is $v_c(n_c)$, the identifying further comprises identifying the cavity frequency of the optical cavity using equation:

$$v_c = \frac{v_c(n_c)}{n_c}. \tag{1}$$

14. The measurement method according to claim 10, further comprising generating, using the frequency shifter, which is an optical SSB modulator, a side lobe in the optical cavity, wherein the outputting the frequency-modulated laser beam further comprises outputting the frequency-modulated laser beam with a plurality of modes of the main lobe and the side lobe, and extracting the signal component further comprises extracting the signal component including the self-beat signals based on the side lobe from the electrical signal generated by converting the monitor light.

15. The measurement method according to claim 14, further comprising:

converting, using a photoelectric converter, the monitor light into the electrical signal, and passing, using a filter and within the electrical signal, signal components that are less than the cavity frequency of the optical cavity.

16. The measurement method according to claim 14, wherein, when the cavity frequency of the optical cavity is $v_c$, a shift frequency of the frequency shifter is $v_s$, an order of the self-beat signal based on the main lobe is $n_c$, the shift order of the frequency shifter is $n_s$, and a peak frequency included in the signal component extracted by the extracting is $v_{cs}(n_s, n_c)$, the identifying further comprises identifying the cavity frequency $v_c$ of the optical cavity using the following equation:

$$v_c = \frac{v_{cs}(n_s, n_c)}{n_c} - \frac{n_s}{n_c} v_s. \tag{2}$$

17. The measurement method according to claim 16, wherein the absolute value of the order $n_c$ of the self-beat signal based on the main lobe is equal to or greater than 2.

18. The measurement method according to claim 17, wherein the order $n_c$ of the self-beat signal based on the main lobe satisfies equation:

$$n_c = \text{ceil}\left(-n_s \frac{v_s}{v_c}\right) \tag{3}$$

where ceil( ) is a function representing taking a ceiling by rounding up.

19. The measurement method according to claim 10, wherein the calculating further comprises calculating a difference d in propagation distances between the reference light and the measurement light with equation:

$$d = \frac{c}{2v_s v_c}\{v_B(m, d) + mv_c\} \tag{4}$$

using a frequency $v_B(m, d)$ of the beat signal obtained by frequency-analyzing the beat signal, where c is speed of light and m is an interval of longitudinal mode numbers of the frequency-modulated laser beam.

\* \* \* \* \*